United States Patent [19]
Heimsoth et al.

[11] Patent Number: 5,764,915
[45] Date of Patent: Jun. 9, 1998

[54] OBJECT-ORIENTED COMMUNICATION INTERFACE FOR NETWORK PROTOCOL ACCESS USING THE SELECTED NEWLY CREATED PROTOCOL INTERFACE OBJECT AND NEWLY CREATED PROTOCOL LAYER OBJECTS IN THE PROTOCOL STACK

[75] Inventors: Daniel Dean Heimsoth, Cary, N.C.; Gary Randall Horn, O'Fallon, Mo.; Mohan Sharma, Austin, Tex.; Laurie Beth Turner, Atlanta, Ga.; Leo Yue Tak Yeung, Austin, Tex.

[73] Assignee: International Business Machines Corporation, Armonk, N.Y.

[21] Appl. No.: 611,849

[22] Filed: Mar. 8, 1996

[51] Int. Cl.$^6$ .......................... G06F 13/14; G06F 15/173
[52] U.S. Cl. .......................... 395/200.57; 395/200.58; 395/200.59; 395/200.6
[58] Field of Search .......................... 370/258, 389; 395/200.01, 200.09, 700, 200.57, 200.58, 200.59, 200.6; 390/200.6

[56] References Cited

U.S. PATENT DOCUMENTS

| | | | |
|---|---|---|---|
| 5,307,490 | 4/1994 | Davidson et al. | 395/684 |
| 5,421,016 | 5/1995 | Conner et al. | 385/700 |
| 5,548,723 | 8/1996 | Pettus | 395/200.01 |
| 5,548,726 | 8/1996 | Pettus | 395/200.09 |
| 5,590,124 | 12/1996 | Robins | 370/258 |
| 5,640,394 | 6/1997 | Schrier et al. | 370/389 |

FOREIGN PATENT DOCUMENTS

| | | |
|---|---|---|
| WO95/17060 | 6/1995 | WIPO . |
| WO95/17065 | 6/1995 | WIPO . |
| WO95/17066 | 6/1995 | WIPO . |
| WO95/17720 | 6/1995 | WIPO . |

*Primary Examiner*—Thomas C. Lee
*Assistant Examiner*—David Ton
*Attorney, Agent, or Firm*—Jeffrey S. Labaw

[57] ABSTRACT

An object oriented protocol interface for establishing a communication path between communication endpoints in a computer network. The generic nature of the interface allows any and several protocol layers to be developed from the same set of protocol class objects. The interface to a communication endpoint for a client application is defined by instantiating a network definition object for the communication endpoint from a network definition class object. The communication endpoint itself is represented by instantiating a network address object from a network address class object. The protocol layers which form the protocol stack are derived from a set of protocol interface objects from a protocol interface class object and a set of protocol layer objects from a protocol layer class object. The objects forming each of the layers in the protocol stack differ in their capabilities according to their respective layer and the protocol which is provided by the protocol stack. The communication path is established in the protocol stack by calling methods in the sets of protocol interface and protocol layer objects.

20 Claims, 20 Drawing Sheets

OBJECT-ORIENTED COMMUNICATION INTERFACE FOR NETWORK PROTOCOL ACCESS USING THE SELECTED NEWLY CREATED PROTOCOL INTERFACE OBJECT AND NEWLY CREATED PROTOCOL LAYER OBJECTS IN THE PROTOCOL STACK

BACKGROUND OF THE INVENTION

This invention relates generally to data communication on computer networks and computer protocols which facilitate such communication. More particularly, it relates to an object oriented communication interface for network protocol access.

In the very early days of computing, computer systems were standalone processors to which peripheral devices such as displays and printers and input devices were connected. Each computer system was independent and there was little communication between computer systems. Today, it is well known to interconnect computer systems in computer networks such as local area networks or wide area networks to achieve a variety of benefits including the sharing of data, services and resources available from the various computer systems coupled to the networks.

To communicate between the different computer systems along a network, many communication protocols have been developed. Some examples of well-known network protocols include the System Network Architecture (SNA), Transmission Control Protocol/Internet Protocol (TCP/IP), Network Basic Input Output System (NetBIOS), and Internet Packet Exchange/Sequence Packet Exchange (IPX/SPX). Other communication protocols are known and widely used and described in various standards of ISO, IEEE and other organizations. To facilitate an understanding of the computer network, the network functions and associated software are often described as a series of layers. Data transfer between one copy of a distributed application over the network to another copy of the distributed application is accomplished by using the services of an underlying series of communication layers. Generally, each layer in one computer system has a counterpart layer in the receiving computer system so that each layer communicates with respective peer layers.

The seven layer Open Systems Interconnect (OSI) model is one of the best known descriptions of network communications, although many communication implementations combine or omit one or more of the OSI layers. In OSI, the physical layer is the lowest layer which interacts directly with the network. It includes the actual bit stream transmission across the physical connections to the network. The second layer is the datalink layer which provides multiplexing and framing of the physical layer stream into messages. It also provides error detection, synchronization information and physical channel management. The third layer is the network layer which controls routing of information through the network. Services such as addressing, network initialization, switching, segmenting and formatting are provided in this layer. Sometimes acknowledgement of data delivery is accomplished in this layer; sometimes in the datalink layer.

The fourth layer is the transport layer which controls transparent data delivery, multiplexing and mapping. Reliable delivery as opposed to best effort in the layers below is accomplished by this layer if desired by the application. Services such as retransmission of missing data, reordering of data delivered out of order and correction of transmission errors are usually accomplished in this layer. The fifth layer is the session layer which uses the information from the transport layer to group pieces of data together as a common activity between two nodes in the network called a session. The sixth layer is the presentation layer which includes the interface between the session layer and the seventh layer the application layer. The presentation layer presents the information for use in the application layer without compromising the integrity of the session layer. The presentation layer provides data interpretation and format and code transformation while the application layer provides user application interfaces and management functions.

Another well known network standard is the IEEE Standard. The primary difference between the IEEE model and OSI, is the splitting of the second OSI layer, the datalink layer into two sublayers, the media access layer (MAC) sublayer and the logical link control (LCC) sublayer. Media access control manages the medium access attachment in its control access to the communications media. The logical link control provides state machine for supporting the protocol specified by an associated data link control.

Another well known technology is object oriented programming which encapsulates data and methods into a programming entity called an object. By protecting certain methods and data through a public interface, an object oriented program can insulate each component from changes to other components yet provide the needed functions with a minimum of reprogramming. For more background information on object oriented technologies, concepts and conventions, the reader is referred to references such as *Object Oriented Design With Applications*, Grady Booch (The Benjamin/Cummins Publishing Company, 1990) and *Object Oriented Software Construction*, by B. Meyer, (Prentice Hall, 1988).

There have been previous attempts to apply object oriented technology to the general area of communication protocol in a multiprocessor network. As will be seen below, it remains a fertile area of invention.

SUMMARY OF THE INVENTION

An object oriented protocol interface for establishing a communication path between communication endpoints in a computer network. The generic nature of the interface allows any and several protocol layers to be developed from the same set of protocol class objects. The interface to a communication endpoint for a client application is defined by instantiating a network definition object for the communication endpoint from a network definition class object. The communication endpoint itself is represented by instantiating a network address object from a network address class object. The protocol layers which form the protocol stack are derived from a set of protocol interface objects from a protocol interface class object and a set of protocol layer objects from a protocol layer class object. The objects forming each of the layers in the protocol stack differ in their capabilities according to their respective layer and the protocol which is provided by the protocol stack. The communication path is established in the protocol stack by calling methods in the sets of protocol interface and protocol layer objects.

BRIEF DESCRIPTION OF THE DRAWINGS

These objects, features and advantages will be more readily understood with reference to the attached figures and following description.

DETAILED DESCRIPTION OF THE PREFERRED EMBODIMENT

The invention may be run on a variety of computers or collection of computers under a number of different operating systems. The computer could be, for example, a personal computer, a mini computer, mainframe computer or a computer running in a distributed network of other computers. Although the specific choice of computer is limited only by disk and disk storage requirements, computers in the IBM PC series of computers could be used in the present invention. For additional information on IBM's PC series of computers, the reader is referred to *IBM PC 300/700 Series Hardware Maintenance* Publication No. S83G-7789-03 and *User's Handbook IBM PC Series* 300 *and* 700 Publication No. S83G-9822-00. One operating system which an IBM personal computer may run is IBM's OS/2 Warp 3.0. For more information on the IBM OS/2 Warp 3.0 Operating System, the reader is referred to *OS/2 Warp* V3 *Technical Library* Publication No. GBOF-7116-00.

In the alternative, the computer system might be in the IBM RISC System/6000 (TM) line of computers which run on the AIX (TM) operating system. The various models of the RISC System/6000 is described in many publications of the IBM Corporation for example, *RISC System/6000*, 7073 and 7016 *POWERstation and POWERserver Hardware Technical* reference, Order No. SA23-2644-00. The AIX operating system is described in *General Concepts and Procedure—AIX for RISC System/6000* Publication No. SC23-2202-02 as well as other publications of the IBM Corporation.

Figure 1:
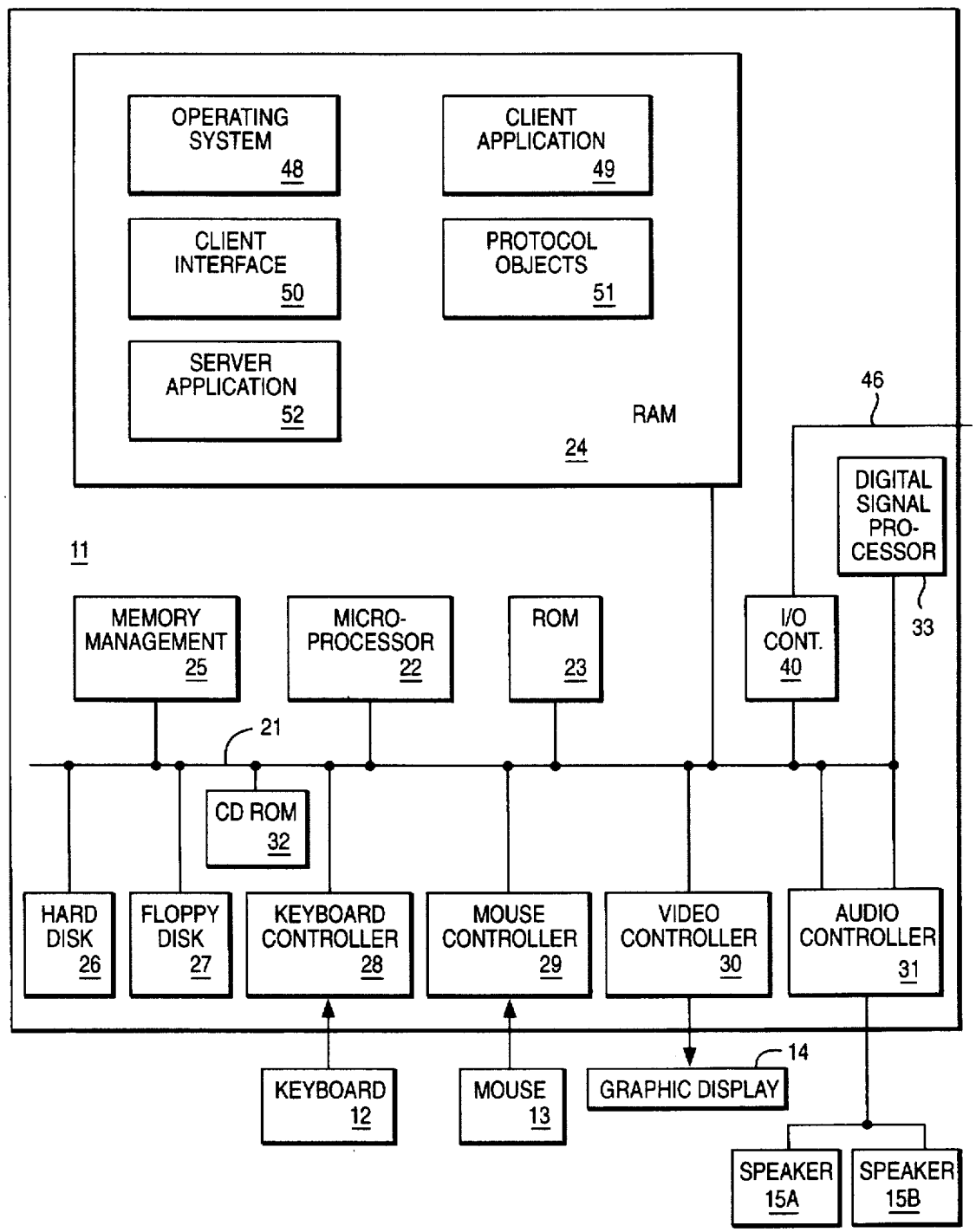
FIG. 1 depicts a computer system configured according to the teachings of the present invention.

In FIG. 1, a computer 10, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM PS/2 series of computers is one of the Intel family of microprocessors including the 386 or 486 microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM, or others made by Hewlett Packard, Sun, Motorola and others may be used in the specific computer.

The ROM 23 contains among other code the Basic Input-Output system (BIOS) which controls basic hardware operations such as the interaction of the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. An I/O controller 40 such as a Token Ring Adapter enables communication over a network 46 to other similarly configured data processing systems.

One of the preferred implementations of the invention is as sets of instructions 48-52 resident in the random access memory 24 of one or more computer systems configured generally as described above. Until required by the computer system, the set of instructions may be stored in another computer memory, for example, in the hard disk drive 26, or in a removable memory such as an optical disk for eventual use in the CD-ROM 32 or in a floppy disk for eventual use in the floppy disk drive 27. One skilled in the art would appreciate that the physical storage of the sets of instructions physically changes the medium upon which it is stored electrically, magnetically, or chemically so that the medium carries computer readable information. While it is convenient to describe the invention in terms of instructions, symbols, characters, or the like, the reader should remember that all of these and similar terms should be associated with the appropriate physical elements. Further, the invention is often described in terms of comparing or validating, or other terms that could be associated with a human operator. No action by a human operator is desirable in any of the operations described herein which form part of the present invention; the operations are machine operations processing electrical signals to generate other electrical signals.

The network in which the workstation is integrated is a Local Area Network (LAN) or a Wide Area Network (WAN), the latter comprising a teleprocessing connection to other nodes or a network of systems operating under a known computer architecture. At any of the nodes, there may be one or more processing systems each of which may be a single user or a multi-user system configured more or less as described above. These processing systems operate as a client or server workstation depending upon whether it is requesting or supplying services. In one particular implementation, the invention runs on a plurality of IBM compatible workstations interconnected by a network communicating by one or more of various communication protocols. The software applications may be packaged together or sold as separate applications. A simplified description of local area networks may be found in a book by Larry E. Jordan and Bruce Churchill entitled: *Communications and Networking For The IBM PC* Published by: Robert J. Brady (A Prentice Hall, Company 1983).

In a preferred embodiment, the invention is implemented in the C++ programming language using object-oriented programming techniques. C++ is a compiled language. Programs are written in a human-readable script and this script is provided to another program called a compiler to generate a machine-readable numeric code which can be loaded into, and directly executed by a computer. The C++ language possesses certain characteristics which allow a software developer to easily use programs written by others while still providing a great deal of control over the reuse of programs to prevent their destruction or improper use. The C++ language is well-known and many articles and texts are available which describe the language in detail.

As known by those skilled in the art, object-oriented programming techniques involve the definition, creation, use and destruction of "objects". These objects are software entities comprising data elements and routines, or methods, which manipulate the data elements. The data and related methods are treated by the software as an entity and can be created, used and deleted as such. The data and functions enable objects to model real-world entity in terms of its attributes, which can be presented by the data elements, and its behavior, which can be represented by its methods.

Objects are defined by creating "classes" which are not objects themselves, but which act as templates which instruct a compiler how to construct the actual object. A class may, for example, specify the number and type of data variables and the steps involved in the functions which manipulate the data. An object is actually created in the program by means of a special function called a constructor which uses the corresponding class definition and additional information, such as arguments provided during object creation, to construct the object. Objects are destroyed by a special function called a destructor.

Many benefits arise out of three basic properties of object-oriented programming techniques: encapsulation, polymorphism and inheritance. Objects can be designed to hide, or encapsulate, all, or a portion of, the internal data structure and the internal functions. More particularly, during program design, a program developer can define objects in which all or some of the data variables and all or some of the related methods are considered "private" or for use only by the object itself. Other data or methods can be declared "public" or available for use by other programs. Access to the private variables and methods by other programs can be controlled by defining public methods which access the objects private data. The public methods form an interface between the private data and external programs. An attempt to write program code which directly accesses the private variables causes the compiler to generate an error during program compilation. This error stops the compilation process and prevents the program from being run.

Polymorphism allows objects and functions which have the same overall format, but which work with different data, to function differently to produce consistent results. For example, an addition method may be defined as variable A plus variable B, (A+B). This same format can be used whether the A and B are numbers, characters or dollars and cents. However, the actual program code which performs the addition may differ widely depending on the type of variables which comprise A and B. Thus, three separate method definitions can be written, one for each type of variable (numbers, characters and dollars). After the methods have been defined, a program can later refer to the addition method by its common format (A+B) and, during compilation, the C++ compiler will determine which of the three methods to be used by examining the variable types. The compiler will then substitute the proper function code.

A third property of object-oriented programming is inheritance which allows program developers to reuse preexisting programs. Inheritance allows a software developer to define classes and the objects which are later created from them as related through a class hierarchy. Specifically, classes may be designated as subclasses of other base classes. A subclass "inherits" and has access to all of the public functions of its base classes as though these functions appeared in the subclass. Alternatively, a subclass can override some or all of its inherited functions or may modify some or all of its inherited functions by defining a new function with the same form.

The creation of a new subclass borrowing the functionality of another class allows software developers to easily customize existing code to meet their particular needs.

Although object-oriented programming offers significant improvements over other programming concepts, program development still requires significant outlays of time and effort, especially if no pre-existing software programs are available for modification. Consequently, a set of predefined, interconnected classes are sometimes provided to create a set of objects and additional miscellaneous routines which are all directed to performing commonly-encountered tasks in a particular environment. Such pre-defined classes and libraries are typically called "frameworks" and essentially provide a pre-fabricated structure for working application.

For example, a framework for a user interface might provide a set of pre-defined graphic interface objects which create windows, scroll bars, menus, etc. and provide the support and "default" behavior for these graphic interface objects. Since many frameworks are based on object-oriented techniques, the predefined classes can be used as base classes and the built-in default behavior can be inherited by developer-defined subclasses and either modified or overridden to allow developers to extend the framework and create customized solutions in a particular area of expertise. This object-oriented approach provides a major advantage over traditional programming since the programmer is not changing the original program, but rather extending the capabilities of the original program. In addition, the framework provides architectural guidance and modeling and, at the same time, frees the developers to supply specific actions unique to the problem domain.

A networking framework is provided by the invention described below to provide network services for the applications of various computer systems in a computer network.

Protocol Interface Model

The object oriented protocol interface model and mechanism are described in this section. The generic nature of this interface enables the development of any layer of the OSI network model. As such, all the network layers will have similar syntax, the semantics of which will be defined by the particular layer specifications. In other words, objects embodying different layers in the OSI network model are similar in syntax, however, their implementation could differ depending on the particular layer responsibilities. Further, the objects embodying respective layers for a particular protocol, e.g., TCP/IP, may differ in capabilities and implementations for similar layers of a different protocol, e.g., Net BIOS, because of the differences in responsibilities of the respective layers in the two protocols. The model also provides mechanisms for defining a communication endpoint, reusing the endpoint, and monitoring network events. Being an object oriented model, it inherits all the features of object oriented implementation such as code reusability, maintainability, and ability to update the implementations without affecting the client applications.

1. Creating a endpoint

The creation of a communication endpoint is facilitated through the network definition objects. Each network definition object contains the definition of a client interface. These are the abstractions for the different types of objects the client program would want to access. The communication endpoint is the TAccessDefinition object which is derived from the network definition class.

Figure 2A:
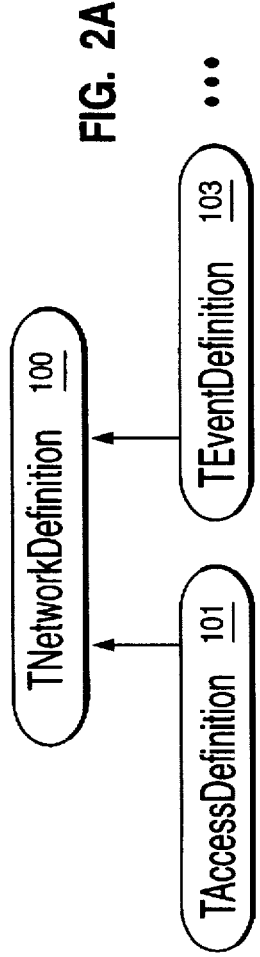
FIG. 2A illustrates a class hierarchy for network definition object.

FIG. 2A gives the class hierarchy for the network definition objects. The TNetworkDefinition class 100 contains methods for instantiating the endpoint and destroying the communication endpoint, InstantiateDefinition and DeinstantiationDefinition, respectively. Methods for constructing a new instance of TNetworkDefinition or destruction of the particular class object are also provided, these methods are common to all the classes and will not be repeated below.

The TAccessDefinition object 101 contains the protocol interface objects that define the particular protocol type and its layers. The TAccessDefinition object 101 serves as the handle for the communication endpoint. In addition, to the methods inherited from its parent, TNetworkDefinition, the TAccessDefinition object 101 also include methods that add an interface layer to the access definition on top of the ones already added. Add to top, methods to add an interface layer to the AccesssDefinition to the ones already added at the bottom, add to bottom, and methods to get the highest protocol layer interface, GetTopOfStack. The TEventDefinition, class 103 is used to monitor the network events. The TEventDefinition class 103 will be described in greater detail below in the NetworkEvent section.

2. Network Address Classes

Figure 2B:
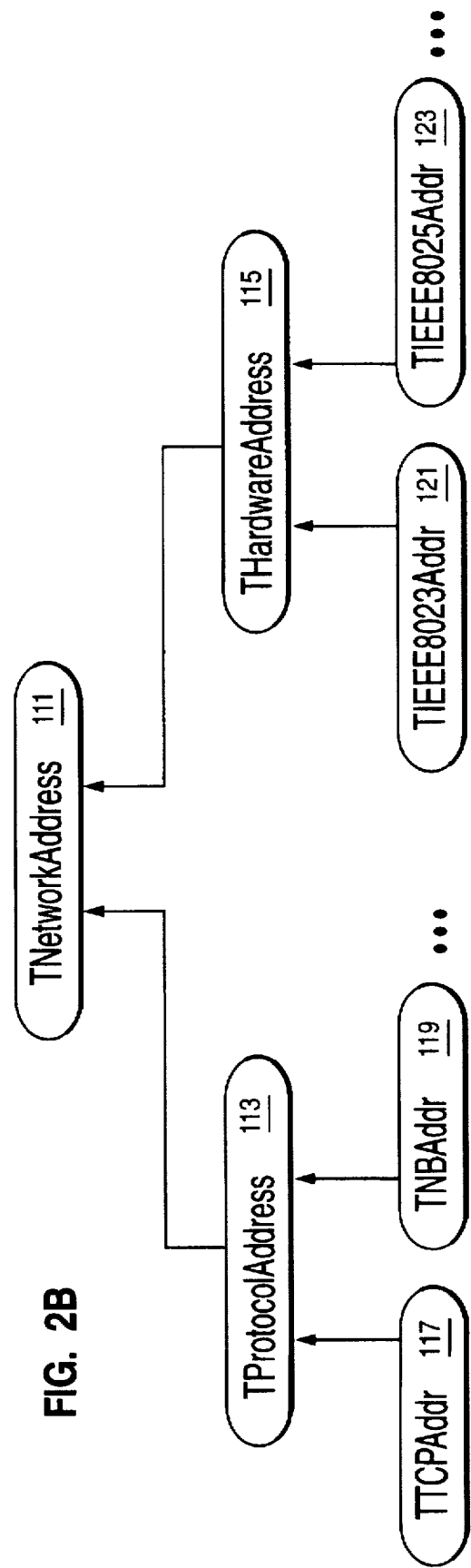
FIG. 2B illustrates the class hierarchy for the network address classes.

The TNetworkAddress class 111 is the base class used to define all the protocol address classes and the hardware address classes. FIG. 2B illustrates the class hierarchy of the protocol address classes. The TNetworkAddress class 111 contains methods for testing a type of address, IsOf AddressType, testing for a group address IsGroup, testing for a broadcast address, IsBroadCast, testing for a multicast address, IsMulticast and testing for a null address, IsNullAddress. This class also contains methods for getting the wire length of an address, GetWireLength, formatting the address into a header, AddressToWire, and getting the address from a header, WireToAddress. There are operators to determine whether a stream is coming into the endpoint which or the stream is originating from the endpoint are also part of the class. A method for getting a pointer is unique for each class, GetClassIdentifier, is provided by the class.

An instance of the TProtocol Address class object serves as a communication endpoint so that the protocol address can be passed. The TProtocolAddress object 113 adds methods for getting a broadcast address, BroadCastAddress, and for getting a null address, NullAddress. Instances of the THardwareAddress object 115 pass hardware addresses to an application if needed. The THardwareAddress object 115 similarly adds methods for getting a broadcast address, BroadCastAddress and getting a null address, NullAddress. It also adds a method for testing for a functional address, IsFunctional. The TIEEE8023 Address class changed the hardware class address according to the IEEEE802.3 addressing conventions. In addition, it adds methods for testing for group address, IsGroup, setting to the group address, SetGroup, reset the group address, ClearGroup. Other methods include BroadCastAddress which gets a BroadCastAddress, IsMulticast which tests for a multi cast address, null address which gets a NullAddress and CanonicalAddress which gets an address from canonical input.

The TTCPAddr 117 and TNBAddr 119 are the examples of some concrete address classes that represent the TCP/IP and NetBIOS addressing specifics, respectively. Similarly, the TIEEE8023Addr 121 and TIEEE8025Addr 123 represent the concrete hardware addresses for IEEE802.3 and IEEE802.5 addressing.

3. Protocol Interface Classes

Figure 2C:
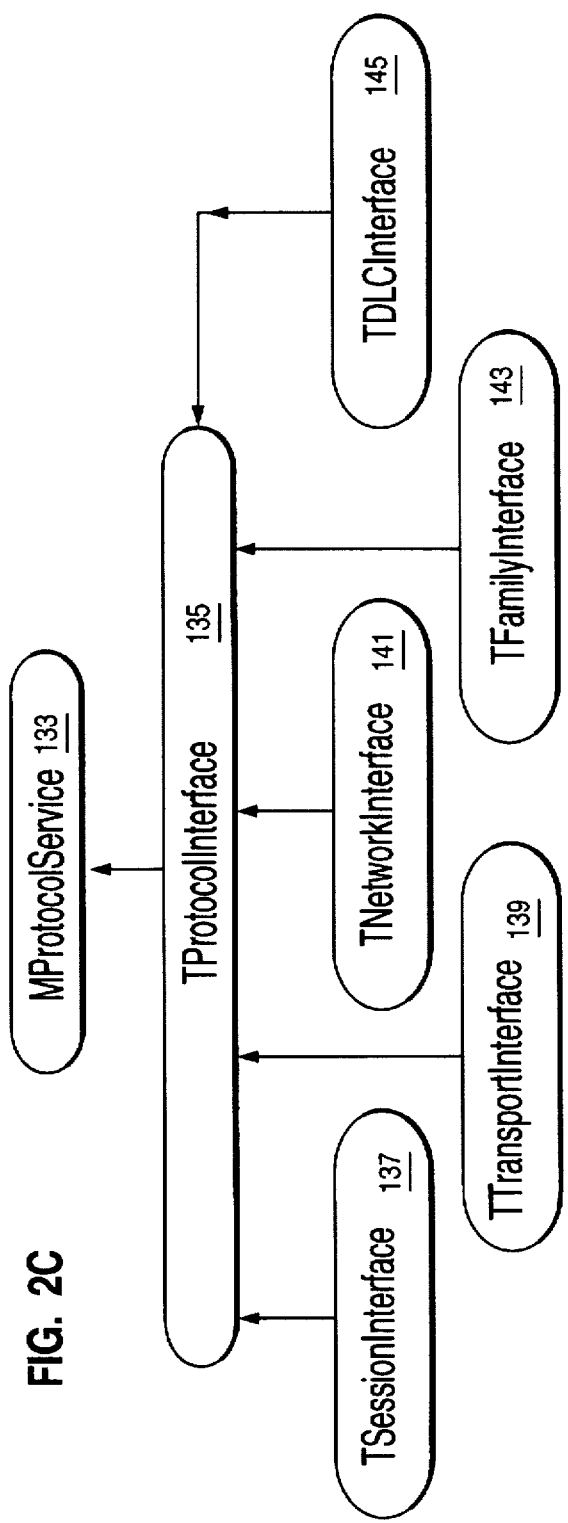
FIG. 2C illustrates the class hierarchy for the protocol interface classes.

The invention supports both the connection oriented and connectionless transactions. It also describes the state machines that a protocol independent application would follow. The object hierarchy for the protocol interface classes is illustrated in FIG. 2C. The protocol interface classes are derived from a base class called MProtocolServe 133 which contains methods for all the common functions that a protocol must have. The TProtocolInterface class 135 contains additional methods for the network functions. These methods are detailed below in Table 1 and Table 2. A network protocol such as TCP/IP will derive its TCPIPInterface class from the TProtocolinterface to override the default implementations and add its own specific features such as a check for valid flags on a send or receive request. Separate classes which derive from the TProtocolInterface class are provided for the session layer, TSessionInterface 137, for the transport layer TTransportInterface 138, for the network layer TNetworkInterface 141, for the family layer TFamilyInterface 143, and for the data link layer TDLCInterface 145. In the object hierarchy is illustrated in this embodiment, the OSI network layer is split into a Network Layer and a lower layer called a protocol Family Layer. The family layer contains the non-replicated portion of the OSI Network Layer such as routing information. The Network Layer contains information relative to a particular endpoint such as the peer address and local SAP. This is done to ensure that only one object such as a FamilyLayer object stays resident in the system keeping all the global information relative to the protocol. As each endpoint is created and destroyed by the client applications, the other protocol layer objects such as the sessions layer and the transport layer objects and network layer object are created and destroyed while the family layer object and the datalink layer object stay resident.

The concrete classes are derived from the individual interface classes. For example, as is discussed below concrete classes are provided for transport, network, and family interface classes for a particular protocol, e.g., TCP/IP, to build the protocol stack.

TABLE 1

As mentioned above, the MProtocolService object serves as the base class for the protocol layer definitions. Following are the list of methods that are provided in the MProtocolService object. Most of these methods are pure virtual functions.

| | |
|---|---|
| Bind | Initialize and bind a local address |
| Unbind | Unbind a local address |
| SendRelease | Orderly release initiation |
| ReceiveRelease | Acknowledge receipt of orderly release initiation. |
| GetLocalAddress | Get the local address |
| SetLocalAddress | Set the local address |
| GetPeerAddress | Get the peer address |
| SetPeerAddress | Set the peer address |
| GetProtocolInfo | Get the protocol info |
| SetProtocolInfo | Set the protocol info |
| GetProtocolOptions | Set the protocol options |
| GetRequestMode | Get the request mode |
| SetRequestMode | Set the request mode |
| GetRetry | Get the protocol layer retry parameter |
| SetRetry | Set the protocol layer retry parameter |
| GetTimeout | Get the protocol layer timeout Parameter |
| SetTimeout | Set the protocol layer timeout parameter |
| GetStatistics | Get the protocol layer statistics |
| SetStatistics | Set the protocol layer statistics |
| IsSession | Return TRUE if protocol layer is a session layer |
| IsTransport | Return TRUE if protocol layer is a transport layer |
| IsNetwork | Return TRUE if protocol layer is a network layer |
| IsFamily | Return TRUE if protocol layer is a family layer |
| Operator<<= | Operator for receiving the object into a data stream |
| Operator<<= | Operator for sending the object into a data stream |

TABLE 2

The following are the list of functions that are provided in TProtocolInterface class.

| | |
|---|---|
| GetLayerIndex | Get the index of the protocol layer |
| Cancel Requests | Cancel all the current outstanding requests |
| ReceiveEvent | Receive events on this stack |
| GetConnectionInfo | Obtain connection info & memory constraints |
| BorrowMemory | Borrow system memory for network data |
| ReturnMemory | Return system memory for network data |
| GetAccessDefinition | Get the pointer to the TAccessDefinition |
| GetLocalAddress | Get the local address for a layer |
| SetLocalAddress | Get the local address for a layer |
| GetPeerAddress | Get the peer address for a layer |
| SetPeerAddress | Get the peer address for a layer |
| GetProtocolInfo | Get the protocol info for a layer |
| SetProtocol Info | Set the protocol info for a layer |
| GetProtocolOptions | Get the protocol options for a layer |
| SetProtocolOptions | Set the protocol options for a layer |
| GetRequestMode | Get the request mode for a layer |
| SetRequestMode | Set the request mode for a layer |

TABLE 2-continued

The following are the list of functions that are provided in TProtocolInterface class.

| | |
|---|---|
| GetRetry | Get the protocol layer retry parameter |
| SetRetry | Set the protocol layer retry parameter |
| GetStatistics | Get the protocol layer statistics |
| GetTimeout | Get the protocol layer timeout parameter |
| SetTimeout | Set the protocol layer timeout parameter |
| Bind | Bind a protocol stack |
| Unbind | Unbind a protocol stack |
| Receive | Receive network data |
| Send | Send network data |
| Connect | Initiate an attempt to establish a connection |
| ReceiveConnection | Wait for an attempt to establish connection |
| Disconnect | Terminate a connection |
| ReceiveDisconnect | Wait for a disconnection |
| AcceptConnection | Accept an attempt to establish a connection |
| RejectConnection | Reject an attempt to establish a connection |
| Listen | Listen for attempts to establish connections |
| ListenForConnection | Listen for an attempt to establish a connection |
| SendRelease | Orderly release initiation => no more data to send |
| ReceiveRelease | Acknowledge receipt of orderly release indication |
| Operator<<= | Operator to stream-in the object to a data stream |
| Operator>>= | Operator to stream-out the object to a data stream |

4. Protocol Layer Implementation Classes

Figure 2D:
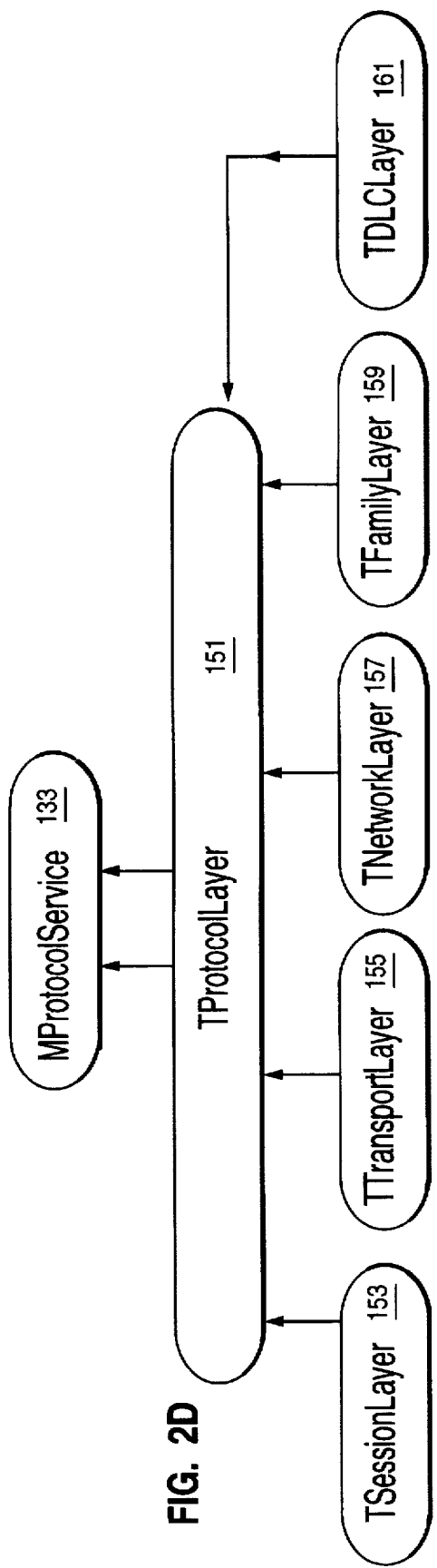
FIG. 2D is an illustration of the class hierarchy for the protocol layer classes invention.

As discussed above, the protocol interface model functions as an object based API to access the protocol layers. The implementation of a protocol stack such as TCP/IP as a layered set of linked objects is achieved by using the TProtocolLayer class. The FIG. 2D shows the class hierarchy for the protocol layer classes. The TProtocolLayer class 151 serves as a base class for all the layers of a protocol implementation.

The TProtocolLayer class 151 contains methods for functions such as Transmit, Connect, Receive, and Disconnect which are implemented at each layer. These methods are detailed in Table 3 below.

The concrete classes for protocols such as TCP/IP derive from these layer objects and incorporate their specific protocol layer semantics.

Each of the child objects 153–161 inherit these methods and override them where appropriate for the specific protocol layer.

TABLE 3

The following are the main functions of the TProtocolLayer class.

| | |
|---|---|
| Dispatch | Dispatch an inbound packet to a higher layer |
| Transmit | Transmit an outbound packet to a lower layer |
| DispatchEvent | Dispatch an event to a higher layer |
| TransmitEvent | Transmit an event to a lower layer |
| ReceiveEvent | Enable reporting of events |
| CancelReceiveEvent | Cancel reporting of events |

TABLE 3-continued

The following are the main functions of the TProtocolLayer class.

| | |
|---|---|
| InstantiateInterface | Create an interface object from a layer object |
| GetUpperProtocol | Get the pointer to the next higher layer |
| GetLowerProtocol | Get the pointer to the next lower layer |
| Bind | Bind a protocol stack |
| Unbind | Unbind a protocol stack |
| Connect | Initiate an attempt to establish a connection |
| ReceiveConnection | Wait for an attempt to establish connection |
| Disconnect | Terminate a connection |
| GetPacketQueue | Return the pointer to the packet queue from which to obtain inbound data packets |
| ReceiveDisconnect | Wait for a disconnection |
| AcceptConnection | Accept an connection initiation |
| RejectConnection | Reject an attempt to establish a connection |
| Listen | Listen for attempts to establish connections |
| ListenForConnection | Listen for an attempt to establish a connection |
| SendRelease | orderly release initiation => no more data to send. |
| ReceiveRelease | acknowledge receipt of orderly release indication. |
| operator<<= | Operator to marshal the TProtocolLayer object to a data stream |
| operator>>= | Operator to unmarshal the Tprotocollayer object to a datastream |

5. Protocol State Machines

Figure 3A:
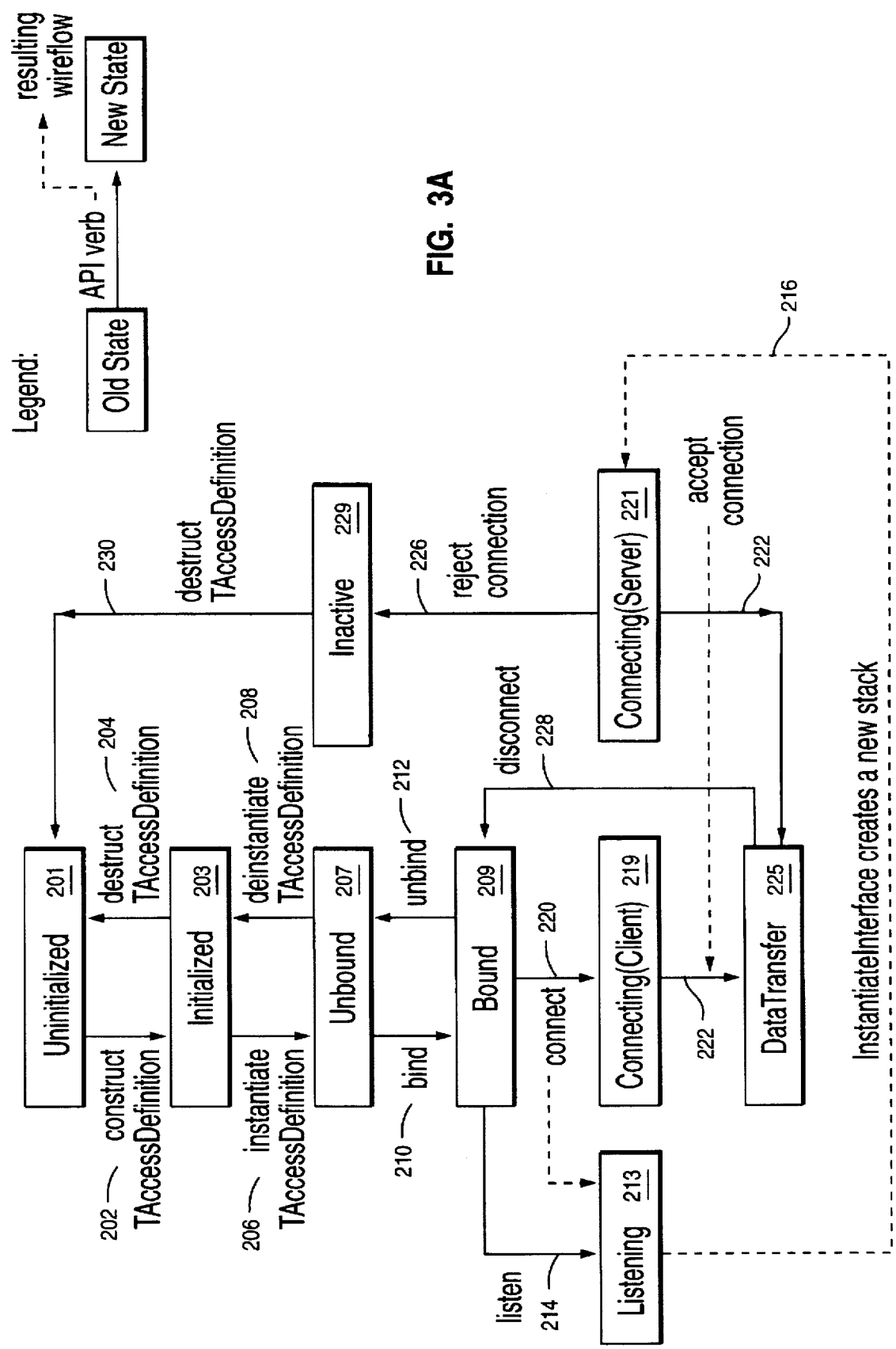
FIG. 3A shows a state diagram for the connection oriented transitions.
Figure 3B:
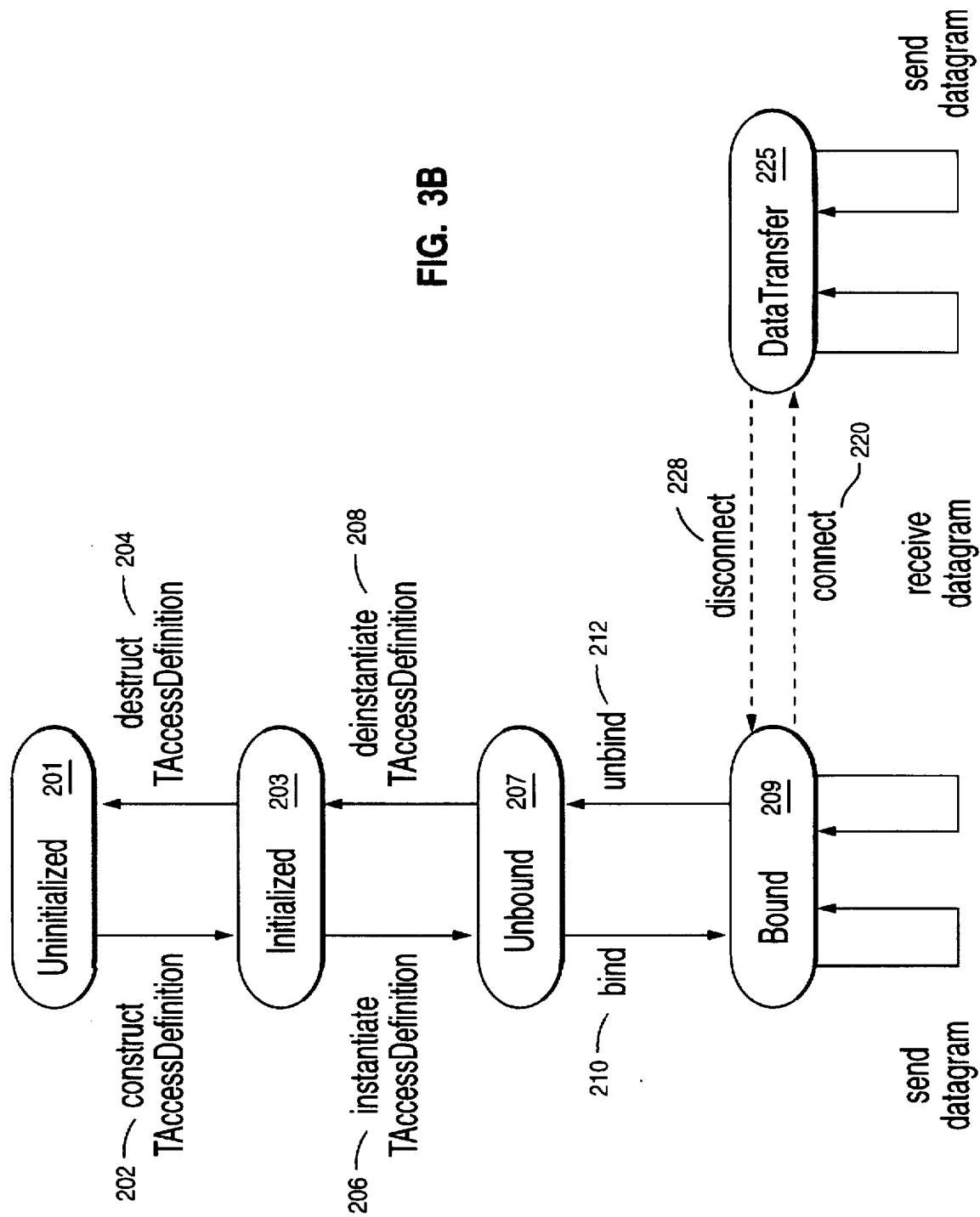
FIG. 3B is a state diagram of the connectionless state transitions.

This section describes the possible states of the protocol interface object for both connection oriented and connectionless operations. The protocol state machines are illustrated in FIGS. 3A and 3B. These state machines depict typical state transitions in protocols although a particular implementation of a protocol may choose to differ. The state machines, however, ensure portability of applications and enables protocol independence. Applications which require protocol independence would use the state machines described below and the protocols supporting protocol independence would implement the state machines.

A protocol endpoint for a particular protocol interface layer object could be in any of the states described below. These states are typically the application states. The layer objects follow the state machine which a particular protocol defines. Typically, these states are to indicate valid calls that a user can make in different "endpoint" states and how an application should be written. The layer states are controlled by the layer semantics and states.

The Uninitialized state 201 defines the start state of the endpoint which is also the final state of the endpoint. This is the state before an access definition is created.

When a TAccessDefinition object is created 202, the endpoint is said to be initialized. In the Initialized state 203, the interface objects could be built and initialized using the Set operations. Since the Set operations are cached locally in the interface objects, there is little scope to validate the set values. In other words, before the protocol layer objects are created via the InstantiateDefinition method the send/receive capacity, can be set on the interface objects. Since the information on the limits to these capacities is known only to the layer objects, it is not possible to validate these values on the interface, as the layer objects do not exist until the InstantiateDefinition method is called on the AccessDefinition object. A request to destruct the TAccessDefinition object 204 moves the endpoint from the initialized state 203 to an uninitialized state 201.

An instantiate request 206 on the TAccessDefinition object, moves the endpoint to the unbound state 207. The Unbound state 207 defines the state that occurs immediately after the layer object has been instantiated. Get/Set operations can be issued to modify values. These requests are no longer cached in the interface object, but are sent to the corresponding layer object for processing and storage. A deinstantiate request 208 on the TAccessDefinition object moves the endpoint to the initialized state 203.

The endpoint moves from the unbound state 207 to the bound state 209 when the Bind operation 210 is issued to bind a local address. An endpoint for connectionless mode of data transfer can begin sending and receiving data once it is in the "bound" state. An unbind request 212 issued to a stack in the Bound state 209 returns the endpoint to the unbound state 207.

The endpoint moves from the bound state 209 to the listening state 213 when a Listen request 214 is issued. The protocol stack will accept incoming connection requests for that local name until the user specified queue size is exhausted. Incoming connections 216 cause new active protocol stacks to be created.

The endpoint moves from the bound state 209 to the connecting (client) state 219 when the Connect request state 219 is issued in an active endpoint. As shown in FIG. 3B, an endpoint using connectionless mode of service enters the "Data Transfer" state 225 after a successful request for connection is made. In the case of a passive endpoint, the protocol stack upon receiving an incoming connection request creates a copy of the layer and interface objects and new TAccessDefinition for the received connection request. The newly created endpoint is then put in the connecting (server) state 221. The arrow is on the dotted line from the Listening state to the Connecting(Server) state. An application may choose to accept the connection or reject it. An AcceptConnection would put the endpoint into the data transfer state 225. If the connection request 226 is rejected, then the endpoint moves to the Inactive state 229.

The endpoint enters the DataTransfer state 225 after a newly created stack completed the connect request 222. A connected endpoint will move to the bound state 209 upon receiving a Disconnect request 228 from the local application or after the connection is terminated by the connected partner. Note that in such a case, the application can issue a ReceiveDisconnect request to receive the termination data.

The endpoint moves to the Inactive state 229 when an incoming connection request is rejected by the application. The endpoint is then discarded by Issuing the destruct TAccessDefinition operation 230.

6. An Example

This section contains an example of how the object-oriented model of the present invention could be used for a network protocol such as TCP/IP. The TCP/IP implementation will contain a transport layer, a network layer, and a TCP/IP Family layer. Further, note that the networking subsystem contains a TDatalink layer object which is resident in the system and that the TCP/IP FamilyLayer object has a way to access the TDatalink layer. Note that in this embodiment, the TDataLink Layer object is common to all network protocol stacks such as TCP/IP, SNA, and NetBIOS and that the TDatalink Layer object derives from the TProtocolLayer class object.

Figure 4A:
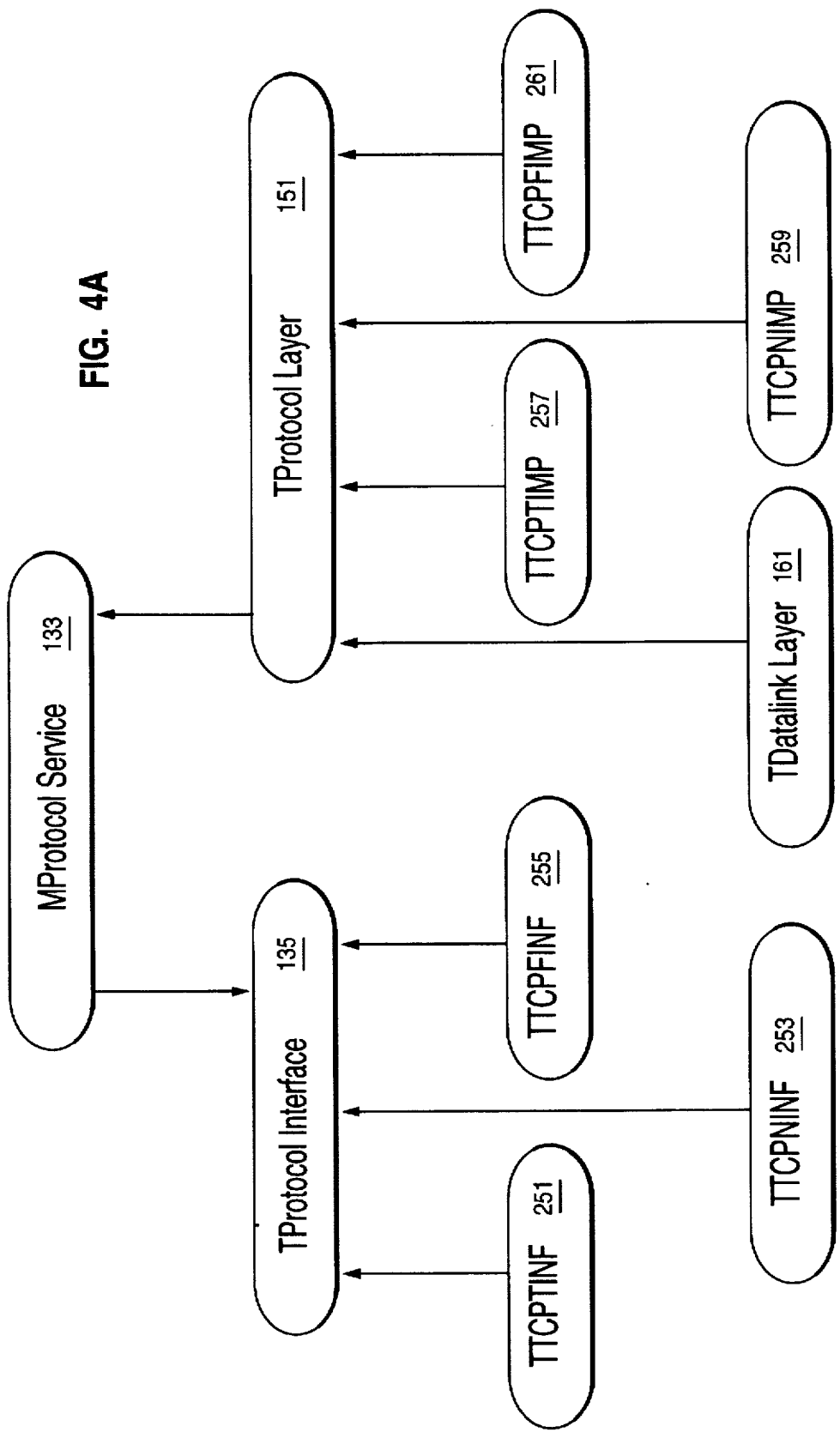
FIG. 4A shows the class relationships for TCP/IP embodiment of the invention.

The TCP/IP interface (API) classes are derived from the TProtocolInterface class. FIG. 4A shows the class hierarchy of some of the objects in the TCP/IP implementation. As discussed above, TProtocol Interface and TProtocol layer are child classes of the MProtocol Service class providing the API and Protocol implementation functions. The TTCPTINF 251, TTCPNINF 253 and TTCPFINF 255 objects are examples of concrete classes of TProtocolInterface that represent the TTransportInterface, TNetworkInterface, and TFamilyInterface classes for TCP/IP protocol. Note that since the TCP/IP protocol does not have a notion of a "session", there is no instance of the TSession Layer class. Similarly, the TTCPTIMP 257, TTCPNIMP 259 and TTCPFIMP 261 objects (collectively referred to as TTCPXIMP) are instances of the TTransportInterface, TNetworkInterface and TFamily Interface classes for the TCP/IP protocol.

As mentioned above, the TDatalinkLayer 161 is an implementation object for all network protocols in this embodiment and is a subclass of the TProtocolLayer class 151.

Also, applications are provided with a TTCPProtocolAddress class so that the IP address can be passed. The TTCPProtocolAddress will contain the 4-byte IP address and a 2-byte port address.

Figure 4B:
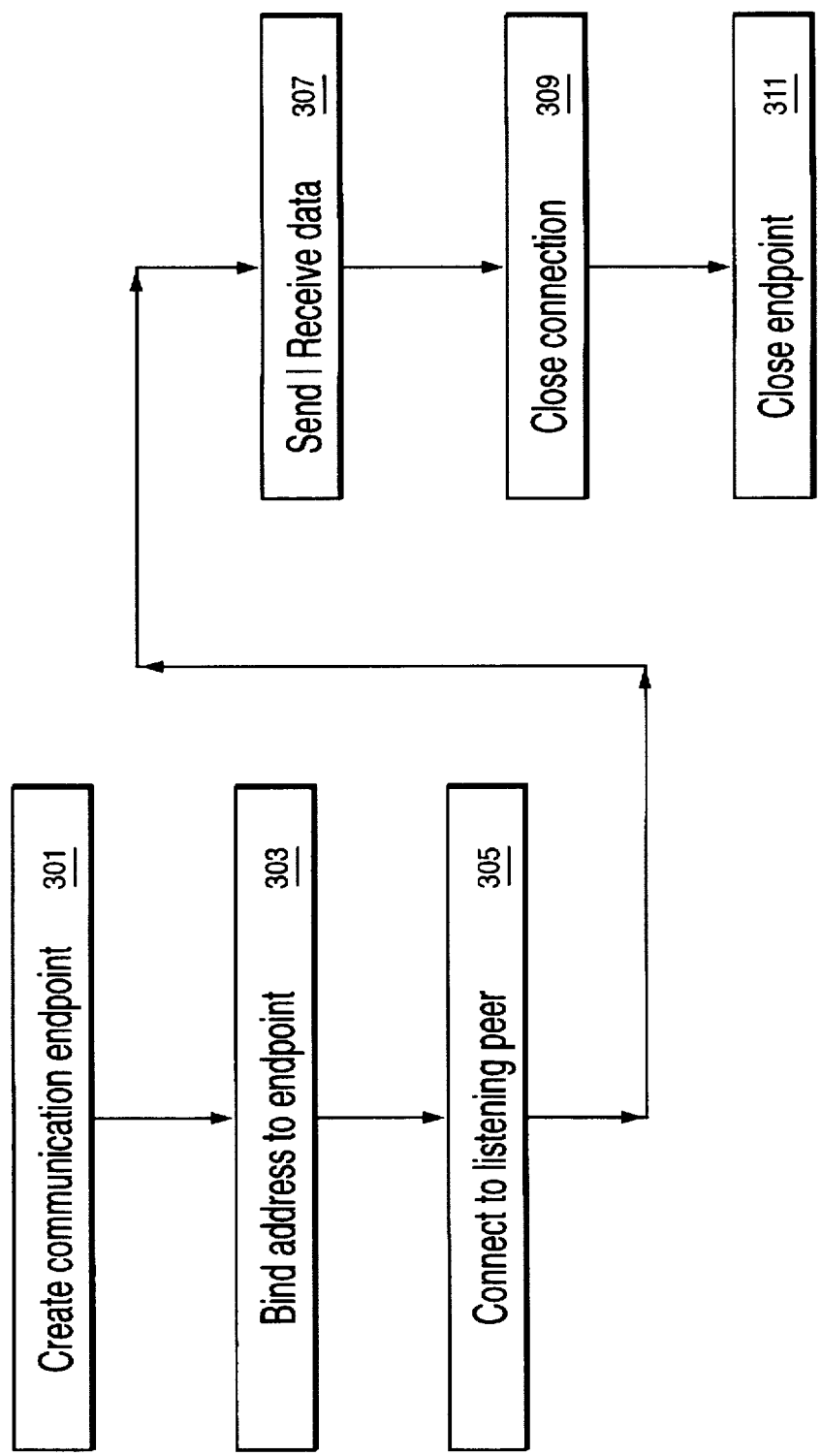
FIG. 4B is a flow diagram of the process for setting up a network connection according to the present invention.

The process which an application needs to access the TCP/IP protocol is discussed below in reference to FIG. 4B. In most cases, the "application" is most likely a communications API layer such as a BSD sockets interface to which a user level application would make API calls. The sockets interface would shield the application developer from the need to know particular syntax of the network protocol objects. However, the "application" could also be an operating system service familiar with the names of the object model of the present invention. The application is accessing the transport layer in the following example. An application can access any of the layers. It could talk to the network layer directly. There are few user applications which currently access the network layer directly, however. These steps are very similar at a high level to those in a procedural implementation of the TCP/IP protocol. However, they are implemented in an object oriented manner using the protocol interface model of the present invention.

In step 301, a communication endpoint is created to access the TCP/IP protocol. This is done by first creating an TAccessDefinition object. For example, using C++, a "new TAccessDefinition" is constructed. Next, the TTCPxINF interface objects are created and added to the AccessDefinition using the methods in TAccessDefinition Then the InstantiateProtocol method is called on the TAccessDefinition object which then creates TTCPxIMP layer objects.

In step 303, an address is bound to the communication endpoint created in step 301. This is accomplished by creating a TTCPProtocolAddress object with the required IP address from the provided TTCPProtocolAddress class object. Next, the TTCPTINF→Bind( ) method is called to bind the address. This step will trigger the TTCPIMP→Bind( ) method on the protocol implementation layers which contain the bind semantics.

Next, in step 307, the application connects to a listening peer by calling the TTCPTINF→Connect( ) method (in the TTCPTINFobject) to initiate a connection request. This triggers the TTCPTIMP→Connect ( ) method (in the TTCP-TIMP object) which then performs the necessary steps for setting up a TCP/IP connection by calling the lower layers namely the TTCPNIMP and TTCPFIMP objects for the TTCPNIP→Connect( ) and TTCPFIMP→Connect methods respectively.

After a successful connection, data may be sent and received over the resulting protocol stack in step 309. The application calls TTCPTINF→Send( ) and TTCPTINF→Receive( ) methods to send and receive network data. The TTCPTINF→Send( ) in turn calls the TTCPTIMP→Xmit( ) method to begin the data transmission semantics of the TCP protocol. The data is passed from protocol layer object to protocol layer object using the Xmit( ) function in each protocol layer and then delivered to the TDataLinkLayer object for it to send it over the communication adapter. Similarly, for the receive function, the TDataLinkLayer receives the data from the physical layer and gives it to the appropriate protocol family layer which in turn passes it to the appropriate stack. In one implementation, the data is queued until a receive data request from the client is made and data is copied from the data queue to the client.

A connection is closed in step 311 after completion of the desired communication. The application calls the TTCPTINF→Disconnect( ) method to initiate the connection termination. This in turn invokes the TTCPTIMP→Disconnect( ) which takes care of TCP/IP disconnect state machine in TTCPTIMP which might send the method and down to the family layer for a particular implementation.

Finally, in step 313, the endpoint is closed by deleting the TAccessDefinition object.

Figure 5:
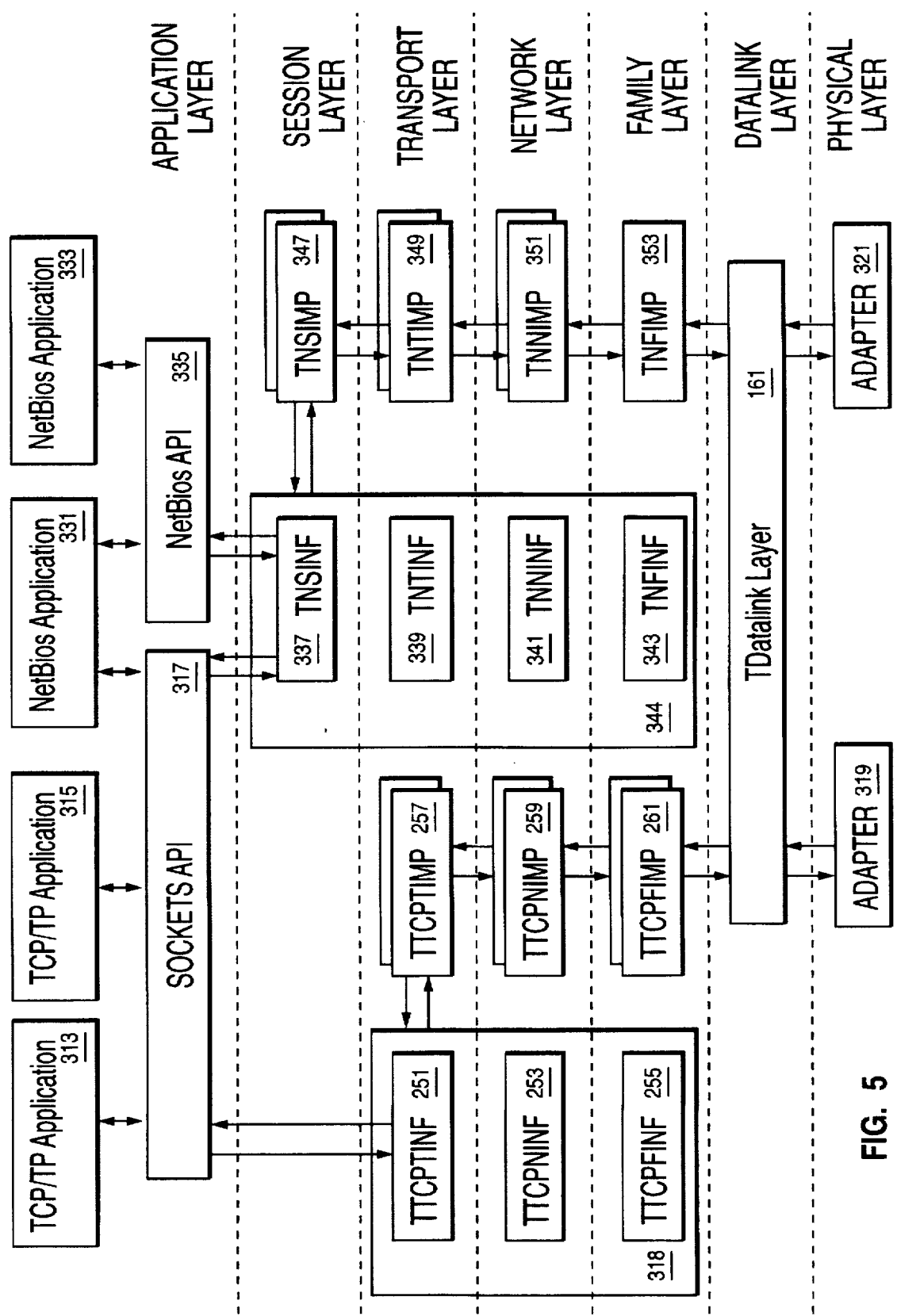
FIG. 5 is an architectural diagram of the various objects in their network layers in the network connection process shown in FIG. 4.

It may help the reader to appreciate the relationship between the various objects and the network layers to refer to FIG. 5. At the left side of the drawing, the TCP/IP embodiment discussed above in connection with FIGS. 4A and 4B is shown. TCP/IP applications 313, 315 communicate via a sockets API 317, both of which are in the application layer, to the object oriented protocol stack in the layers below. The TProtocolAddress object used by the sockets API to create a communication endpoint is not shown in the figure. A separate communication endpoint, and therefore, a separate TProtocolAddress object is needed for each TCP/IP application 313, 315.

As mentioned above, TCP/IP does not have a notion of a session layer so the sockets API 317 communicates with the TTCPTINF object 251 in the transport layer. As discussed above, the TAccessDefinition object 318 contains the TTCPxINF objects 251, 253, 255 in the transport, network and family layers. It would be relatively rare for user level processes to communicate to the protocol stack through the network or family layers, however, the TTCPNINF object 253 and TTCPFINF object 255 are provided for communication to those layers, primarily by operating system services.

The TTCPTINF object 251 connects to the TTCPTIMP object 257 with the TTCPTINF→Connect( ) method. This triggers the TTCPTIMP→Connect( ) method to connect to the TTCPNIMP object 259 and the TTCPNIMP→Connect( ) method to connect to the TTCPFIMP object 261. The TTCPFIMP→Connect( ) method is triggered which connects to the TDatalinkLayer object 161. As shown in the figure, the TTCPTIMP 257, TTCPNIMP 259, TTCPFIMP 261 and TDatalinkLayer 161 objects are in the transport, network, family and datalink layers respectively. As discussed above, the send and receive methods allow network data to be sent over the protocol stack via the physical adapter 319 in the physical layer.

In the preferred embodiment, the TDataLinkLayer object 161 and TTCPFIMP object 261 are persistent and singular as communication endpoints are created and deleted. A separate thread and instance of each of the other objects (251, 253, 255, 257, 259, 318) is required for each active endpoint. As one skilled in the art could readily appreciate, in the case of a network protocol server with potentially thousands of client connections, the overhead associated with such an arrangement could cause performance problems. As discussed in the Dynamic Execution Unit Management section below, the present invention provides a means to dynamically manage the execution threads to maximize performance.

On the right side of the figure, a NetBIOS implementation is shown. Thus, the present invention contemplates a multiprotocol environment wherein the system may support multiple applications running multiple network protocols. As shown in FIG. 5, the NetBIOS applications 331, 333 may communicate with the lower layers either through the sockets API 317 or a specialized NetBIOS API layer 335. Thus, the invention also contemplates multiple applications able to access the object oriented protocol stacks of the present invention. These applications can be object based or procedurally based, either user level applications or operating system level processes.

A similar process as described above is used to establish the NetBIOS stack. Note that as NetBIOS does have session layer semantics the API layers 317, 335 connect to the TNSINF object 337 in the session layer. After the NetBIOS interface objects, TNSINF 337, TNTINF 339, TNNINF 341, TNFINF 343, and the NetBIOS protocol layer objects, TNSIMP 347, TNTIMP 349, TNNIMP 351, TNFIMP 353, are created, the communication pathway is established through the TNSINF object 337 through the protocol layer objects to the TDataLinkLayer object 161. As in the TCP/IP embodiment, the TDataLinkLayer object 161 and the TNFIMP object 353 are persistent and singular, whereas a separate instance of each of the other objects is created and deleted for each of the active communication endpoints.

Multiple adapters 319, 321 may be accommodated by the present invention coupled to the TDataLinkLayer 161. These adapters may be used for different network protocols concurrently as the upper layers will provide the proper routing to the communication endpoints. Furthermore, the adapters can be of different types, e.g., Ethernet and Token Ring, so that the server can service requests from different networks.

7. Protocol Utility Classes

These classes are used by the TProtocolInterface and TProtocolLayer classes. Most of these classes serve as parameters of various methods in the Interface and implementation classes. These classes highlight the generic nature of the proposed model.

This section contains some of the important classes of which protocol interface makes use.

a. TProtocolInfo Class

This class identifies various characteristics of the protocol such as service type, maximum message size, and expedited data length. The following are some of the important methods the class provides.

These are used to specify the endpoint characteristics at the time of creating these endpoints.

| GetPSDUSize Unit | Get the protocol service Data maximum size SetPSDUSize Get the Protocol Service Data Unit maximum size |
| GetEPSDUSize | Get the Expedited Protocol Service Data Unit maximum size |
| PSDUSize | Set the Expedited Protocol Service Data Unit maximum size |
| GetConnectionDataSize | Get the Connect Data maximum size |
| SetConnectDataSize | Set the Connect Data maximum size |
| GetDisconnectDataSize | Get the Disconnect Data maximum size |
| SetDisconnectDataSize | Set the Connect Data maximum size |
| GetDisconnectDataSize | Get the Disconnect Data maximum size |
| SetDisconnectDataSize | Set the Disconnect Data maximum size |
| GetServiceType | Get the service type such as connection/connectionless |
| SetServiceType | Set the Service Type |
| SetServiceType | Set the Service Type |
| SetServiceFlags | Set the Service Flags | b. TProtocolOptions Class This class is used to define protocol specific options including quality of service. However, the base class does not include any particular quality of service. The concrete classes are expected to derive from the TProtocolOptions and include their specific options.

GetLingerTime -Get the protocol linger time
SetLingerTime -Set the protocol linger time
GetSendbufSize -Get the protocol Send Buffer size
SetSendbufSize -Set the protocol Send Buffer size
GetRcvbufSize -Get the protocol Receive Buffer size
SetRcvbufSize -Set the protocol Receive Buffer size c. TSendModifiers Class The TsendModifiers class qualifies the flags that are associated with a network Send function in TProtocolInterface::Send and TProtocolLayer::Xmit( ) methods. The indications that could affect a send function are as follows besides supporting a send timeout.

| kPush | request immediate processing |
| kEdnOfMessage | mark end of message |
| kExpeditedData | treat data as expedited |
| kNotify | notify sender when client buffer is available |
| kSendAll | block until all "n" bytes are buffered |
| kNoFragmentation | do not fragment the data |

The following are some of the important functions supported in this class.

| GetSendModifier | Get the value for a SendModifier |
| SetSendModifier | Set a SendModifier ON |
| ClearSendModifier | Set a SendModifier OFF |
| GetTimeout | Get the send timeout |
| SetTimeout | Set the send timeout | d. TReceiveModifiers Class

This class is used to define the receive flags in the TProtocolInterface::Receive( ) function.

This class contains the methods and definitions for setting flags and timeouts while receiving network data. These are as follows:

| kPeek | peek user data |
| kExpeditedData | receive expedited data |
| kReceiveAll | block until "n" bytes are received |

| | |
|---|---|
| kBroadcastData | receive broadcast datagrams |
| kDiscardBufferOverflow | discard the part of message that overflows the receive buffer |
| kDatagramAny | receive either normal or broadcast datagrams |

The following are some of the important functions of this class.

| | |
|---|---|
| GetReceiveModifier | Get the value for a ReceiveModidier |
| SetReceiveModifier | Set a ReceiveModifier ON |
| ClearReceiveModifier | Set a ReceiveModifier OFF |
| GetTimeout | Get the receive timeout |
| SetTimeout | Set the receive timeout | e. Send Completion Class

The sendcompletion object is returned in response to a network data send operation. It indicates the status of the send function and also indicates the total number of bytes sent. The following are the status indications.

| | |
|---|---|
| kNormal | normal completion |
| kTimeout | send timeout |
| kCancelled | application cancelled the send request |

The following are some of the important methods of this class.

| | |
|---|---|
| GetSTatus | Get the SendCompletion status |
| SetStatus | Set the SendCompletion status |
| GetBytesTransferred | Get the number of bytes of client data sent |
| SetBytesTransferred | Set the number of bytes of client data sent | f. TReceiveCompletion Class

The receive completion object is returned in response to a network data receive request. It indicates the status of the receive function and the total number of bytes of data received. The following are the status indications.

| | |
|---|---|
| kNormal | normal completion |
| kPushed | sender "pushed" the data |
| kNoMoreData | stream is ending or the receive pipe closed |
| kEndOfMessage | end-of-message encountered |
| kExpeditedData | expedited data received |
| kTimeout | receive timeout |
| kMessageTruncated | partial msg & the rest is discarded. |
| kCancelled | cancel request processed |
| kMore | more data ready to be received |

The following are some of the important functions of this class.

| | |
|---|---|
| GetStatus | Get the ReceiveCompletion status |
| SetStatus | Set the ReceiveCompletion status |
| GetBytesTransferred | Get the number of bytes of client data received |
| SetBytesTransferred | Set the number of bytes of client data received |

Network Event Management

This section discloses an object-oriented solution to the problem of accessing multiple network events over multiple network protocol stacks and storing them at various protocol layers is described in this section. A single and consistent set of class definitions for all network events based on the OSI network protocol layer model are provided by the invention. Events are defined for each generic OSI layer and each implementation of these layers could choose to add additional layer specific events by defining additional subclasses. Being an object-oriented model, this solution takes full advantage of polymorphism and inheritance in OO technology.

The classification of events based on OSI layers provides a clear categorization of events which are stored and reported at a protocol layer. With this categorization events can be retrieved for a particular layer, if it is of interest to the applications. These events may describe conditions of the communication session of the client has established, e.g., data received and is available for receipt or the connection has been aborted. A client can monitor these asynchronous events on any protocol layer of multiple protocol stacks using a single call. The invention spans event reporting over multiple protocols such as TCP/IP and NetBIOS so that the application need not look for individual endpoint events. In addition, the network event mechanism facilitates interaction between network protocol layers to send and receive network events between layer objects.

1. Event Description

Figure 6A:
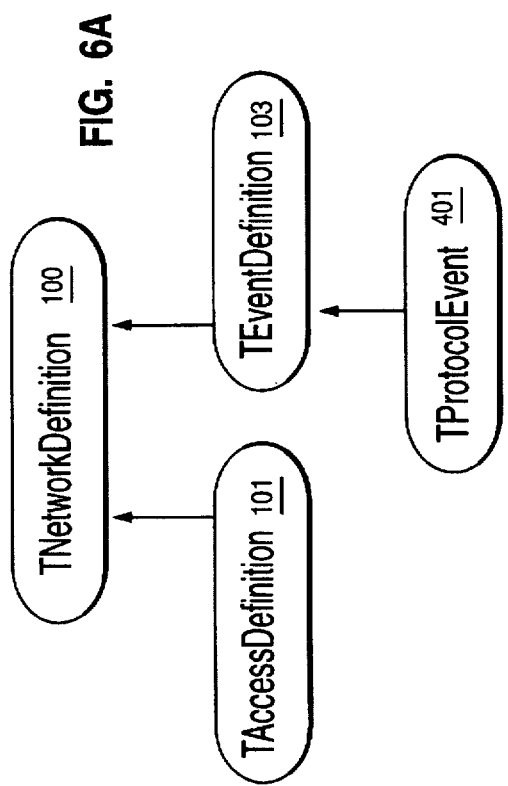
FIG. 6A is a class hierarchy for the network event objects.

Events are defined using a base class known as the TProtocolEvent. FIG. 6A illustrates the class hierarchy between the various event objects. FIG. 6A is similar to FIG. 2A, accept that it also shows the TProtocolEvent class 401 which is a subclass of the TEventDefinition class 103. The TProtocolEvent class 401 contains an enumerated class of events, a set of commonly used events at all OSI layers and reserved range of values for individual protocol layer events. The TProtocolEvent class has methods for setting and getting events and membership questions. In one embodiment, network events are set as bit vectors, in this class and the GetCnt method returns the number of events currently in this object. This is a typical way of specifying a list of options, events in this case; another way used commonly is to use bit masks. Only a single object is required due to the power of object oriented technology, hiding all data within the object and provides method to get them.

A particular network protocol may define protocol events by redefining the event values in the TProtocolEvent class. Some of the important methods in TProtocolEvent are: GetEvent returns the event of the index identified; HasA which Searches for a particular event in the list (membership); GetCnt which returns the number of events in the object; GetAccessDefinition which returns the access definition which indicates the endpoint; SetAccessDefinition which sets the access definition for the endpoint and SetEvent which Sets a single event in the TProtocolEvent object.

2. Event Interface to a OSI Layer Implementation

As discussed in the Protocol Interface Model section above, in the preferred embodiment, the network protocol layers are implemented as a sequence of TProtocolLayer objects, each representing a particular OSI layer. These objects are chained to each other to complete a protocol stack. For example, a TCP/IP stack may have objects for the transport layer, the network layer, and the datalink layer. Each protocol layer object has two event interfaces, namely the ReceiveEvent interface and the CancelEvent interface as defined in the TProtocolLayer object. The layers use the DispatchEvent method to pass an event to an object in a higher layer and the TransmitEvent method to send an event to a lower protocol layer. It is up to an implementation of a protocol stack to store the events in appropriate layers.

The event related methods in the TProtocolLayer class are: DispatchEvent which dispatches an event to a higher layer; TransmitEvent which transmits an event request queue to a lower layer; ReceiveEvent which reports event(s) by adding a TProtocolEvent object to the EventRequestQueue; and, CancelReceiveEvent which disregards the EventRequestQueue.

3. Event monitoring by an application

The TProtocolInterface class object which provides the base class for the object based API to each of the network protocol layers contains a function which an endpoint can use to receive network events. The event related function in the class TProtocolInterface is the ReceiveEvent method which receive event(s) set in the TProtocolEvent object for a particular communication endpoint.

The TEventDefinition object is used when an application needs to monitor events over multiple communication endpoints. The TEventDefinition object serves as a object-endpoint to monitor events. An instance of this object is created and deleted as needed by the application. The main methods in the TEventDefinition object are: InstantiateDefinition which instantiates an instance of the TEventDefinition object; DeInstantiateDefinition which destroys the instance of the TEventDefinition object; ReceiveEventAny which receive events from multiple stacks, either in an array or queue of TProtocolEvent objects; and CancelRequest which cancels a pending event request.

a. Receiving events on one communication endpoint

An application can receive events on a particular endpoint using the ReceiveEvent method on an instance of the TProtocolInterface class for a particular network layer. Note that the endpoints access protocols using the TProtocolInterface object for that protocol. The application program sets the required events in a TProtocolEvent object and then calls the ReceiveEvent method. The TProtocolInterface object returns a TProtocolEvent object containing the events, if any, which have occurred.

Figure 6B:
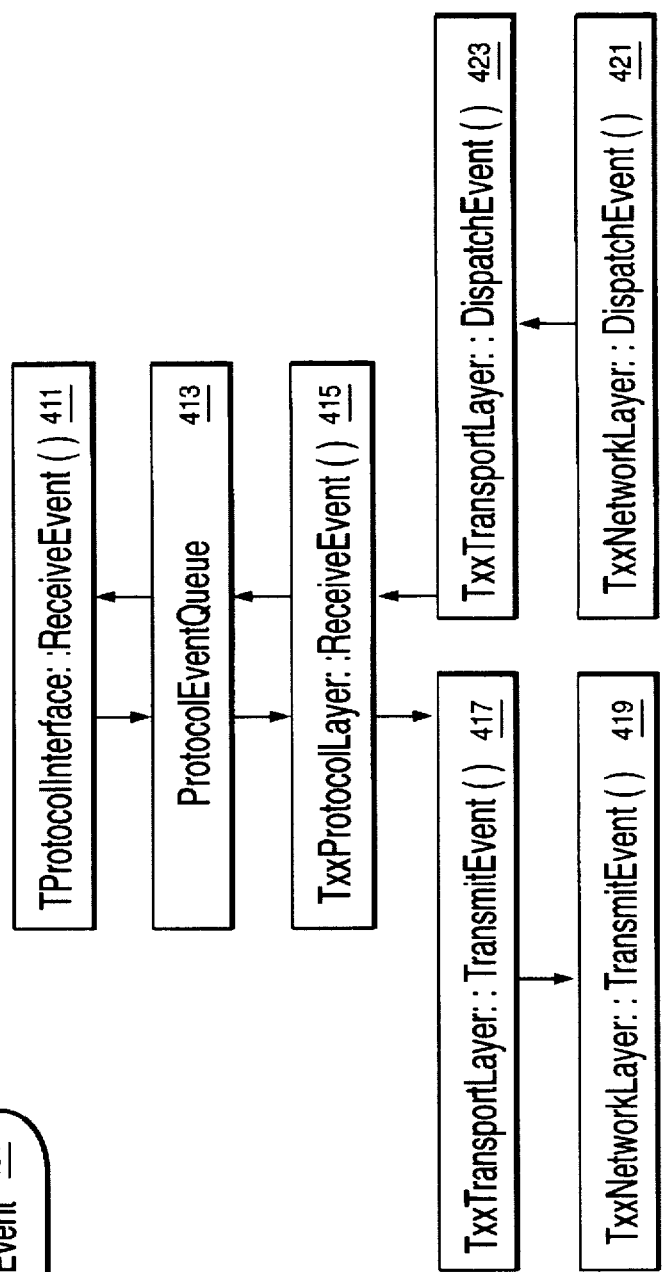
FIG. 6B is a flow diagram for the process for collecting events from a single communication endpoint.

The process of receiving events on one communication endpoint is illustrated in the flow diagram in FIG. 6B. In this example, the transport layer is the top layer and the event is stored in the network layer and the request from the application is made to the transport layer.

Another alternative is to set up an event interface directly to the layer to receive the event. However, the process will have to do so with every layer for events which is not much of advantage. It is better to get it from one point and the client makes one call to get events from all layers using the event vector as a selection criterion.

FIG. 6B describes the event receiving mechanism over a single endpoint. A request to receive one or many events over the endpoint is made to the interface object using the TProtocolInterface::Receive Event( ) 411 method. A ProtocolEventQueue 413 created internally which eventually contain the TProtocolEvents reported by the endpoint. The request is then sent to the corresponding layer object using the TProtocolLayer::ReceiveEvent( ) 415 method. The figure shows how the request is sent between the layer objects. The TProtocolVentQueue is sent as a parameter in the ReceiveEvent request. The protocol layer object enqueues a TProtocolEvent to this queue whenever an event occurs and before receiving a TProtocolLayer::CancelEvent( ) request which invalidates the TProtocolEventQueue. Depending on the requested events, TxxTransportLayer may send the request down to the TxxNetworkLayer 417 using the TransmitEvent( ) method in TProtocolLayer class. Similarly, the TxxNetworkLayer may send the request 419 down to the TxxFamilyLayer if the event request should reach the lower layers.

Whenever an event occurs asynchronously, the TProtocolLayer object may report the event to a higher layer using the DispatchEvent( ) 421. The network layer then reports this event to the TxxTransportLayer 423. The TxxTransportLayer enqueues the reported event in the ProtocolEventQueue 415. The event is then reported back to the caller 411.

b. Receiving events over multiple communication endpoints

Applications may create an endpoint for events for multiple communication endpoints by using the TEventDefinition object. As shown in FIG. 6A, TEventDefinition class 103 is derived from the TNetworkDefinition class 100. The TEventDefinition object 103 serves as an endpoint for monitoring events over any protocol and for any number of endpoints. For each communication endpoint of interest to the application program, the required number of ProtocolEvents is set in the TProtocolEvent object. In other words, pairs of the 2-tuple (endpoint, protocolevent) are formed for all the endpoints whose events are to be monitored. The application then makes a call to ReceiveEventAny( ) method in the TEventDefinition object passing the set of requested events from various endpoints. The ReceiveEventAny returns with events in a queue of TProtocolEvents or times out. It should be noted that all the communication endpoints are created using the TAccessDefinition class.

Figure 6C:
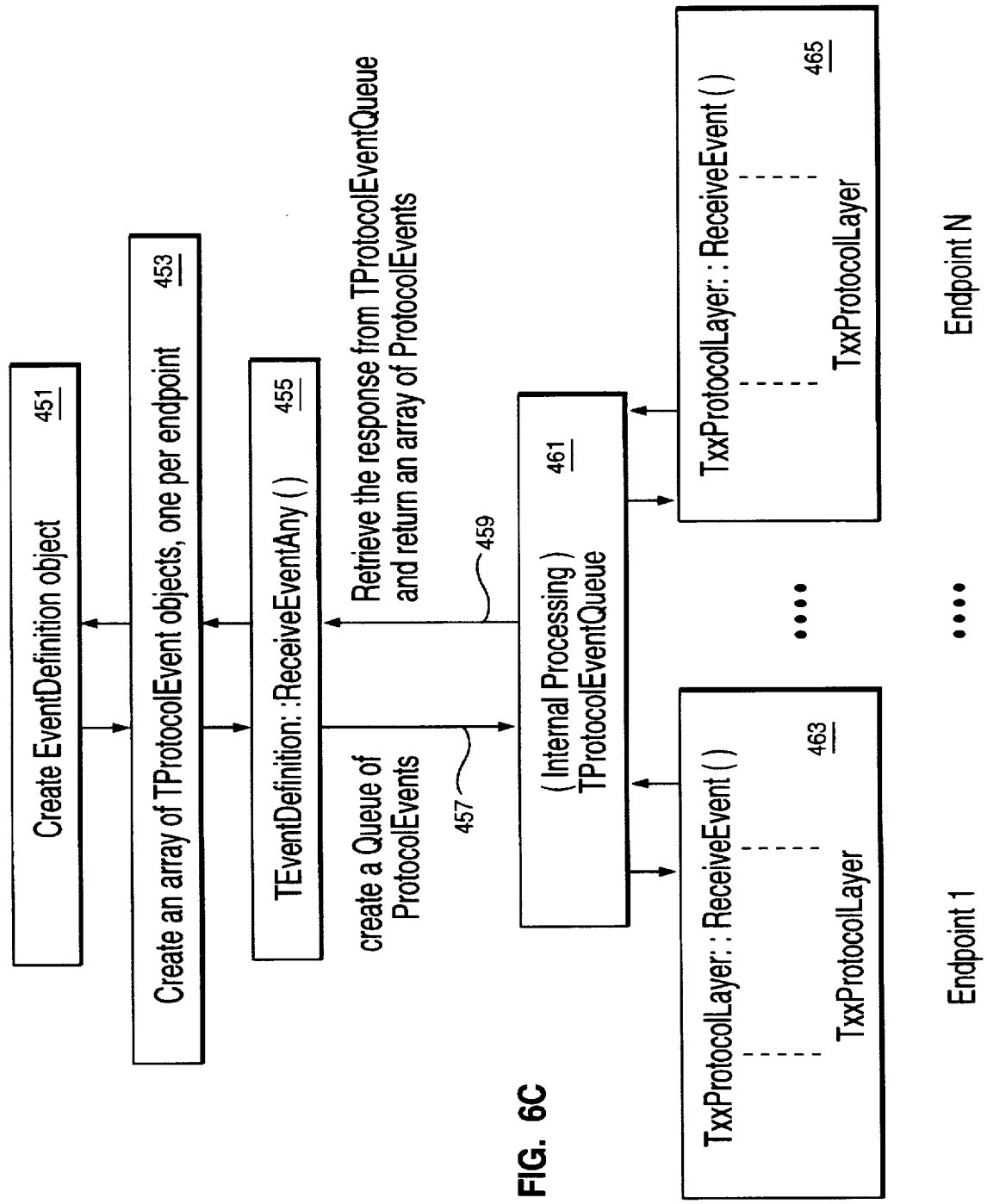
FIG. 6C is a flow diagram for the process for collecting events from multiple communication endpoints.

FIG. 6C illustrates the receive event mechanism over multiple endpoints. The application creates a TEventDefinition object 451 which serves as an event endpoint. The application then creates an array of TProtocolEvent objects 453 one per endpoint. The array of requested events over the endpoints is passed as a parameter to the TEventDefinition::ReceiveEventAny( ) 455. The ReceiveEventAny( ) method creates a TProtocolEventQueue 457 and sends the queue 461 to all the endpoints over which the events are sought. The TxxProtocolLayer which receives the request via the ReceiveEvent request 463 may transmit the event request to the layer below. This is the same for all the endpoints 465. Whenever a TxxProtocolLayer receives an event asynchronously, it may either dispatch the event to a higher layer or report the event in the TProtocolEventQueue. Once an event is in the TprotocolEventQueue, a TxxProtocolLayer::CancelEvent( ) is sent to the TxxProtocolLayer of all the associated endpoints. The ReceiveEventAny method 455 then retrieves 459 all the TProtocolEvents from the TProtocolEventQueue and reports them to the caller. If there are no events reported, then the queue would be empty.

After a response is received from any of the endpoints, then all the endpoints receive a CancelEvent request to indicate that the life of the ProtocolEventQueue object is over. Even though, the request has been canceled, the event still are saved in the protocol layer. The client can come back with another ReceiveEvent next time to get new events. In this embodiment, a pull model from the client is used meaning the client obtains the event when convenient to the client. The collected set of ProtocolEvents are returned to the caller.

Dynamic Execution Unit Management

In a multi-tasking system, a network protocol stack such as TCP/IP can be efficiently implemented using a client/server model. The server may be a user level task using multi-tasking techniques to support a large number of clients. To guarantee satisfactory performance when supporting a large number of clients, it is often necessary to preallocate a fixed set of server resources to a particular process. One critical server resource is the number of allocated server execution units. In a modern operating system such as OS/2 and Windows NT, the basic unit of execution is a thread. While many today's systems have "light-weight" threads (meaning fast thread switching), unfortunately, thread creations/deletions are not "light-weight" enough to support the performance requirements of a network protocol server like that proposed by the present invention when scaling up to support thousands of clients.

Furthermore, as the number of threads increases, the system, i.e. the server, performance degrades significantly. Thread switching overhead tends to increase proportionally as the number of threads increases in addition to footprints allocated in the system. This is further complicated for a network server which may need to support multiple concurrent requests from the same client, e.g., performing a send and receive data in two threads in full duplex communication under a network session. As a result, the number of threads in the server dedicated to service multiple concurrent clients may be very large. Therefore, managing the server execution units, e.g., threads, efficiently is critical to the server's ability to support large number of clients with satisfactory performance.

This section discloses a method for a Network Protocol Server to dynamically manage the number of execution threads. This method reduces the threads resources required to serve a large number of clients. Admission control is provided to keep individual clients from consuming all of the server allocated thread resources. At the same time, a particular client will not be starved indefinitely waiting for server thread resources.

1. Server Execution Unit Management

Server threads are created and managed in a server thread pool. When the server is first started up, a server management thread is created. In one preferred object oriented embodiment, this is done by instantiating a TNetworkServer class object which contains methods for managing the client port pool and network server threads pool described below. The server management thread is responsible for management of the server thread pool by coordinating the creation or deletion of server threads in the thread pool. The server management thread is normally asleep. It will be wakened up by a request signal and a timer periodically.

All client requesting services must establish a session with the server initially. The session request is sent to a single server communication end point called session_port. Each client is assigned an unique communication end point called client_port after a communication session with the server has been established. In a preferred embodiment, there is a one to one correspondence between a TAccess Definition Object with each client_port assigned on the Server Side.

The client and the server may communicate with each other using an RPC mechanism. The remote procedure call (RPC) mechanism provides the necessary request routing and admission control as discussed below. The RPC mechanism can be built on top of internal process communication Internal procedure call (IPC) services of the underlying operating system. In addition to locating the server task, the following are the basic RPC primitives:

Client side,
SendRequest(server_port(session or client), request_data, reply_data)
Server side,
ReceiveRequest (request_data)
SendReply (reply_data)

Figure 7A:
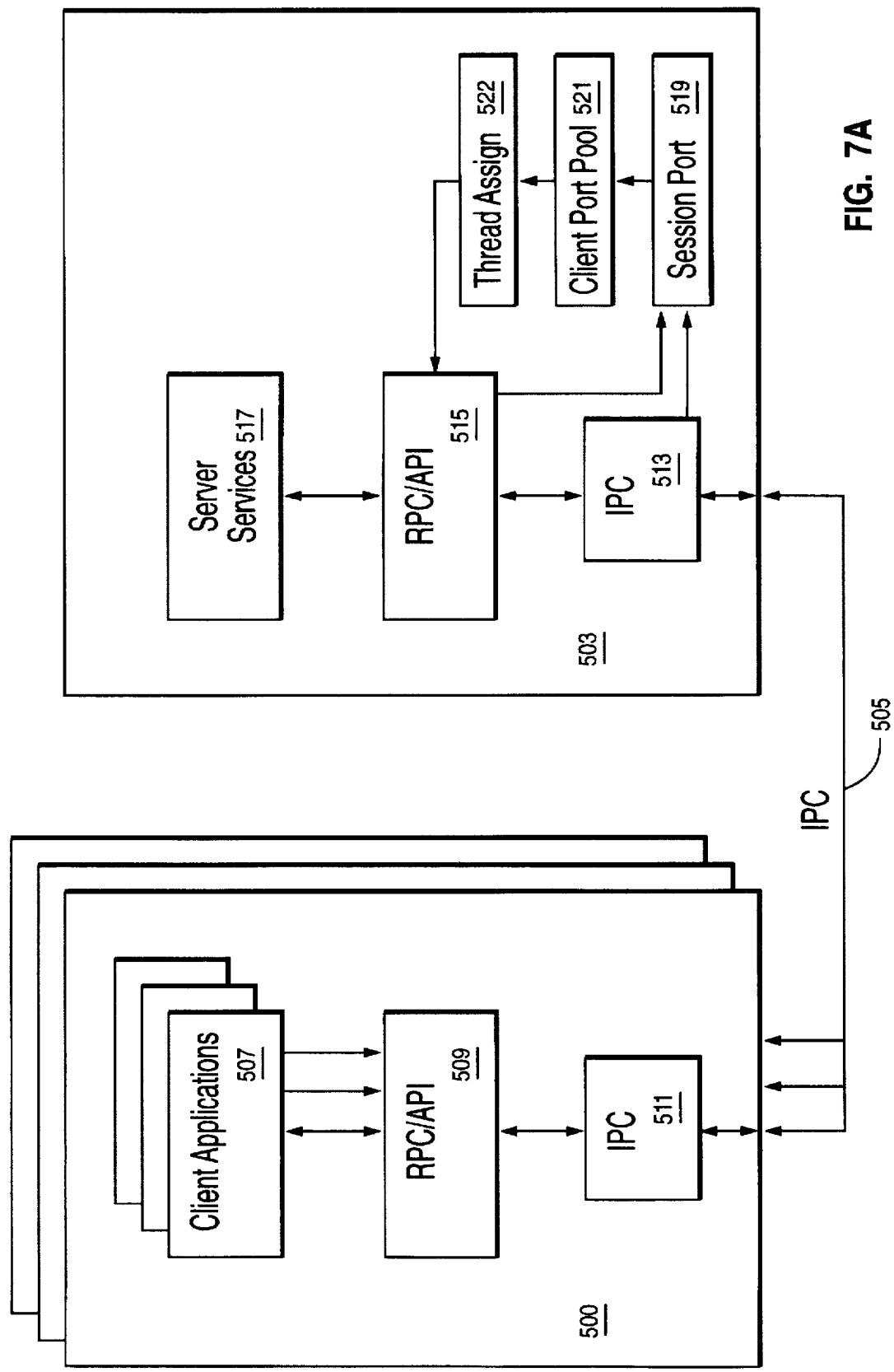
FIGS. 7A and 7B are architectural diagrams of a first and second embodiment for managing a pool of communication threads for handling client requests of a network protocol server.

The client_ports of all the clients are collected into a client_port pool. Using its assigned client_port, the client can now issue a network request to the server. The server manages requests from the client_port pool, and assigns a thread in the thread pool to service requests received from any member of the client_port pool. FIG. 7A illustrates the flow of control and management of the client_port pool and thread pool in a first object oriented network embodiment wherein the client and server application objects reside in memory allocated to different processors in a multiprocessor configuration such as a symmetrical multiprocessor (SMP) and the two communicate via an object oriented RPC interface.

A plurality of client machines 500 communicate to a server machine 503 over a network 505. Each of the client machines 500 may have a plurality of client application objects 507 resident each capable of making client requests. As shown, the client objects 507 send their requests to an appropriate RPC/API object in the RPC/API layer 509 which makes the connection to the server using an IPC object 511 running in a different address space. The protocol stack establishes the communication path to the network 505. According to the embodiment, a thread counting object, described in more detail below, is added to the protocol stack to determine whether the client machine or client task has exceeded its allowance of communication threads at the requested server. Otherwise, the communication path will not be created and the client process will be told to wait for an available thread or the protocol stack will simply deny service to the client process. Although only one server is pictured in the diagram, the thread counting object can keep track of the client accounts at a plurality of server machines in the network.

Presuming that the communication path to the server is established, the protocol stack 513 receives the client request which it sends to the session port object 519 which assigns a session port, a communication endpoint at the server end. The client request is assigned a client port from the client pool object 521. The client port is a client communication endpoint which is returned to the client protocol stack if there are sufficient threads available at in the thread pool 522 at the server. The set of network protocol server objects which manage the session port allocation, the client port pool and the thread pool are described in greater detail below. Once the threads, client port and session port have been allocated, communication can proceed to the server set of RPC/API objects 515 and upward to the server services 517.

Figure 7B:
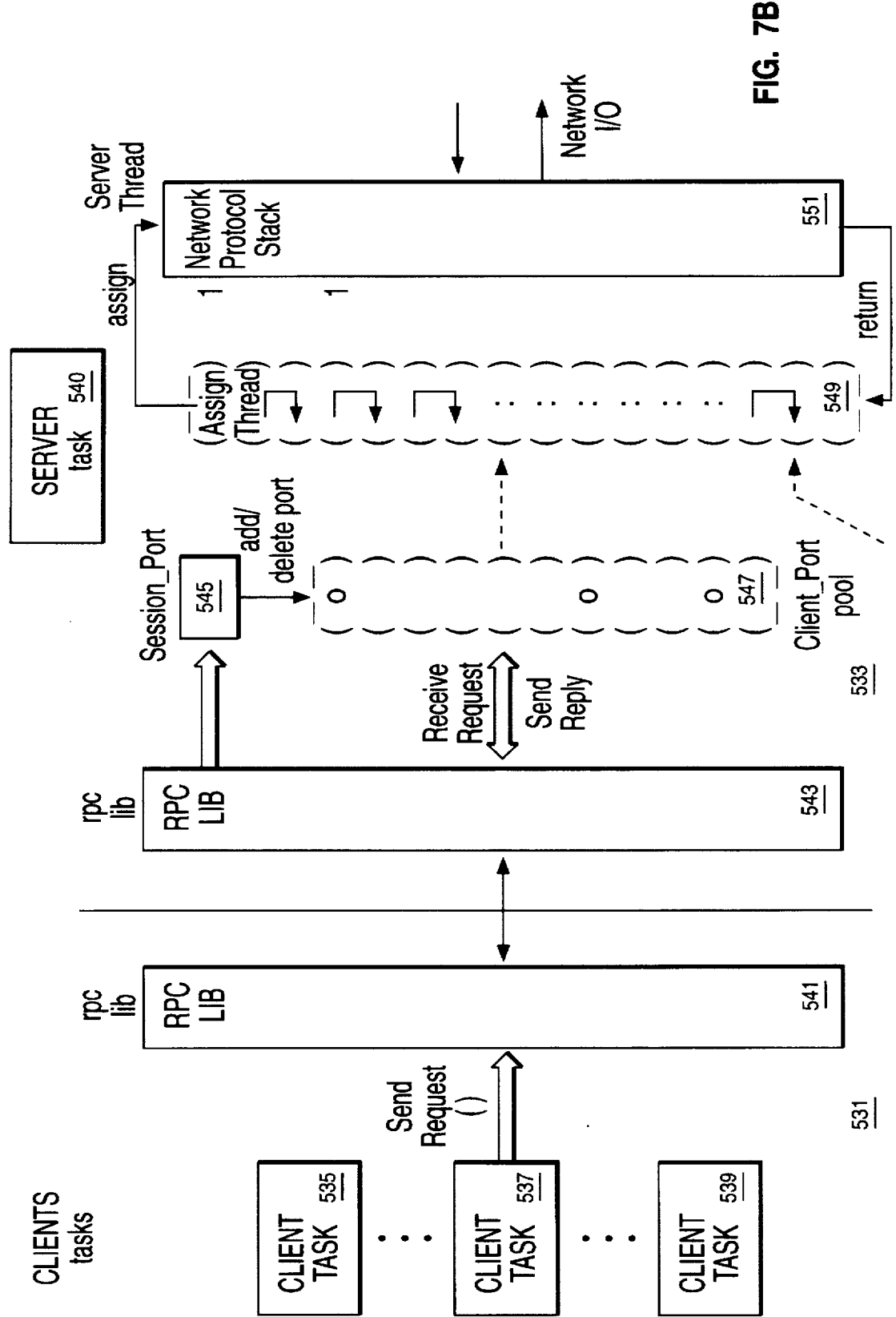

The dynamic execution unit management can also be performed in a procedurally based system. Also, as shown in FIG. 7B, the mechanism can be applied to a single processor machine whose memory is divided into a client space 531 and a server space 533, an environment wherein a plurality of client tasks 535, 537, 539 are running in the same machine as a server task 540. The client tasks send their requests to the server task via a client side RPC library interface 541. The requests are first handled on the server side by a server side RPC library 543. Next, a session port is allocated by the session port process 545 and a client port is allocated from the client port pool 547. Threads are assigned from the thread pool 549 so that the protocol stack 551 can handle the client requests out to the network 553.

The number of threads within the pool is controlled by several system configured variables. These variables may be modified by a system administrator with a user configuration program.

(MinThreads)—This is the minimum number of threads reserved to service client requests. This limit is used to maintain the minimum number of threads used to support a typical server load of clients.

(MaxThreads)—This is the maximum number of threads reserved to service client requests. This limit is used as an upper bound on thread resources dedicated to serve a peak load of clients without overloading the server system.

(MaxReq)—This is the maximum number of concurrent requests that the given client is allowed.

(TotalThreads)—This is the total number of threads created to service all client requests. This value is always between the MinThreads and MaxThreads.

(ReservedThreads)—This is the total number of reserved to support all the client sessions.

(Unusedthreads)—This is the number of unused threads in the pool.

(Clientthreads)—For each client, this is the number of active requests being serviced by the server.

The number of threads in the pool grows or shrinks dynamically based on the number of concurrently active clients requests being processed.

The processes, or methods in the object oriented embodiment, used to manage the number of threads is discussed in greater detail below in reference to FIGS. 8A–8D.

Figure 8A:
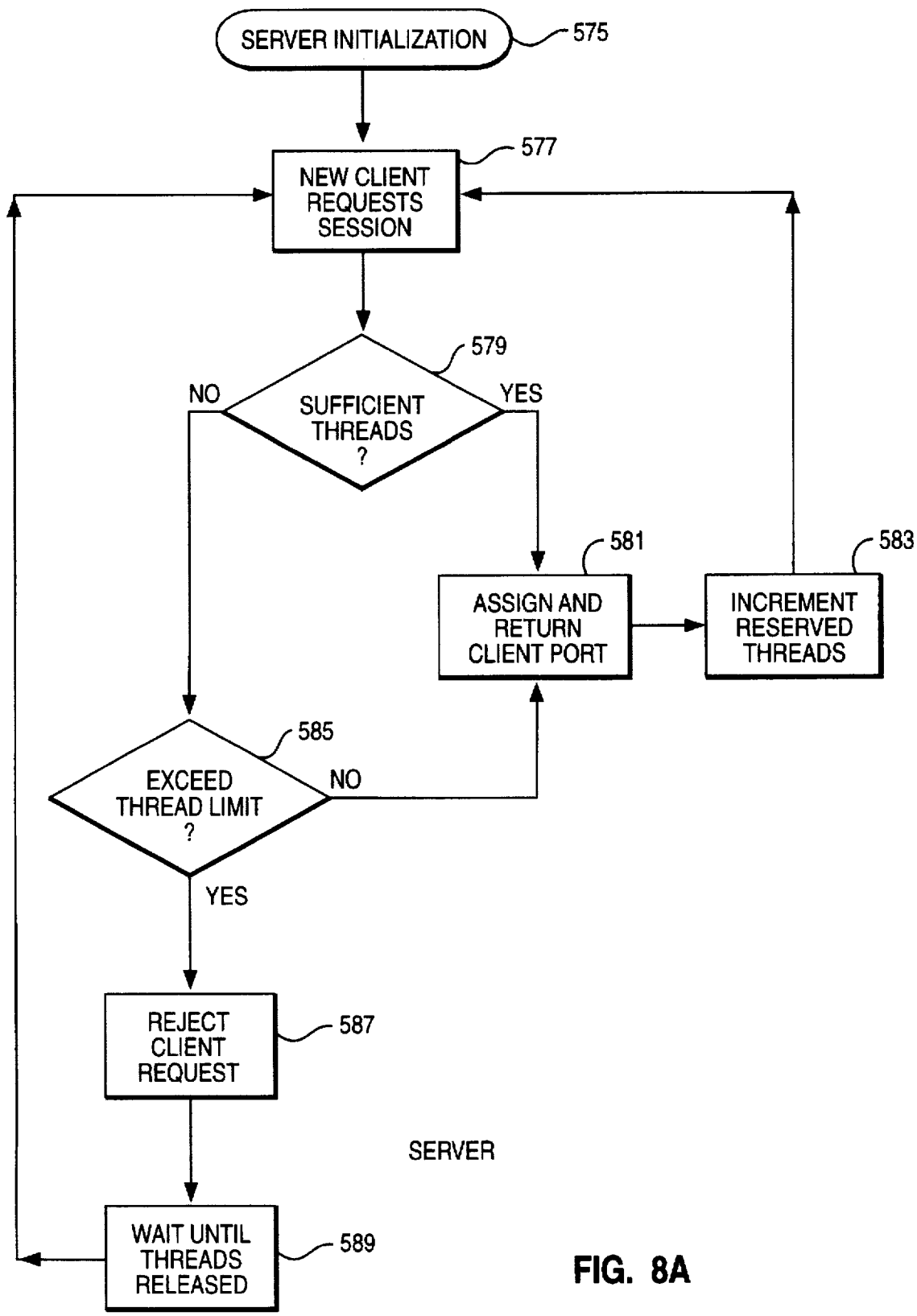
FIGS. 8A-8D are flow diagrams of the management process for the pool of communication threads.

Referring now to FIG. 8A, in step 575 at server initialization, a <MinThreads> number of threads are created and inserted into the thread pool. Also in this step, (UnusedThreads) & (TotalThreads) is set to (MinThreads), and (ReservedThreads) is set to 0. In step 577, a new client requests a session with the server. On the server, after receiving the client request, a test in step 579 is performed to determine if (ReservedThreads)+(MaxReq)→ (MinThreads). If this is true, no action will be taken to adjust the thread pool as there are sufficient threads to support the existing and the new clients.

In step 581, the server assigns and returns a client_port to the client task. In step 583, (ReservedThreads) is incremented by (MaxReq) and returns to step 577 to wait for a new client to request a session.

If the test in step 579 is negative, a test in step 585 is performed to determine whether the maximum number of threads would be exceeded if the client request were granted. The test of whether (MinThreads)<(ReservedThreads)+ (MaxReq)<(MaxThreads) is performed. If this is true, then the thread limit is not exceeded and the process goes to step 581 to assign and return the client port to the client task. In step 583, (ReservedThreads) is incremented by (MaxReq). While the process in this figure looks similar for this branch and the one described above, as described below, the management thread will increase the threads asynchrounously in the thread pool the next time it is wakened based on the new (ReservedThreads) count.

If the test in step 585 is positive, that is, if (ReservedThreads)+(MaxReq)>(MaxThreads), then the client request is rejected in step 587. Thus, the server administers client session admission control to avoid an overload situation. In step 589, the server could enter a wait state until threads are released by other client tasks, possibly informing the client of the wait state. Alternatively, the server could just reject the client, request and allow the client to try again later.

The psuedocode below provides an example of implementing this process:

```
New client request session with server
On the server-
    If (ReservedThreads) + (MaxReq) <= (MinThreads),
        (ReservedThreads) increment by (MaxReq)
        Assign and return a client_port to the client
    If (MinThreads < (ReservedThreads)+(MaxReq)<(MaxThreads)
        Increment (ReservedThreads) by (MaxReq)
        Assign and return a client_port to the client
    If (ReservedThreads) + (MaxReq) > (MaxThreads)
        Reject the network request
```

Figure 8B:
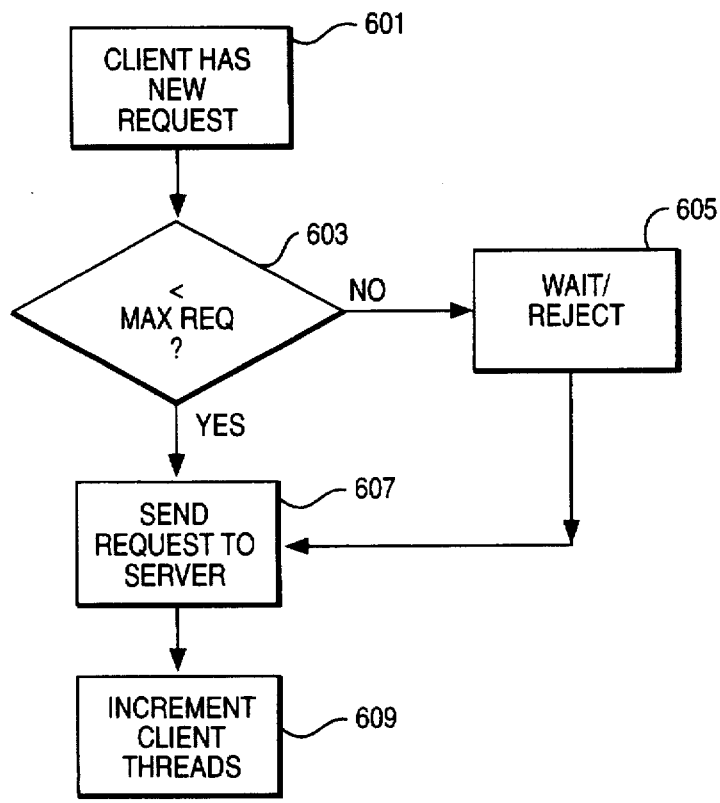
Figure 8B:
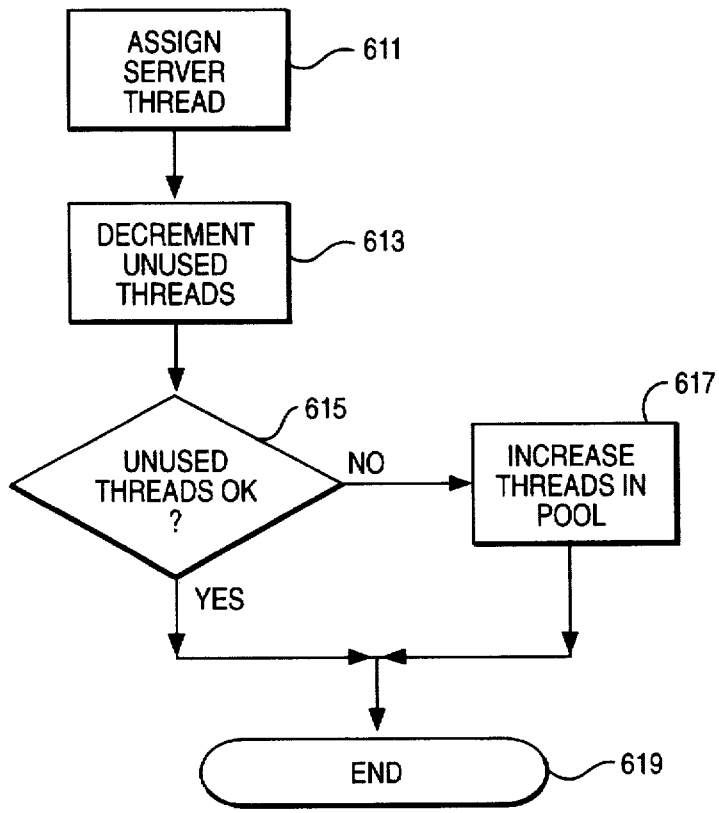

In FIG. 8B, the client side process for administering client request admission control is depicted. In step 601, a client task issues a new network request using an assigned client port to the server. In step 603, a test is performed to determine whether the client task has some available threads of the allowed number of threads at the server. The test if (ClientThreads)<(MaxReq) can be used to determine this fact. If so, the client request is sent to the server in step 607. In step 609, the number of current client threads is incremented.

If all of the allowed number of threads at the server are in use, the network request is either rejected or put into a wait state until the number of concurrent requests from this client is less than (MaxReq) in step 605. If in a wait state, and one of the allowed threads is released, the process can proceed from step 605 to step 607.

Also depicted in FIG. 8B, is the process on the server side for assigning server thread in thread pool to service client requests and adjusting the number of threads in the pool. In step 611, a server threads is assigned to a client request for the duration of time required for processing the client request. In step 613 the (UnusedThreads) variable is decremented. A test is performed in step 615 to determine whether the number of threads in the thread pool is acceptable. The test if ((UnusedThreads)<(MinThreads) & (TotalThreads)< (MaxThreads)) is one test to perform this step. If the number of available threads in the thread pool is not acceptable, the management thread is signaled to increase the number of threads in the thread pool. The process ends in step 619.

The following psuedocode shows a possible implementation of these processes:

```
Client issues network request to the server
    If (ClientThreads) < (MaxReq),
        Send the request to the server.
        Increment (ClientThreads)
    else
        Reject the network request Assign server thread to service client request
Decrement (UnusedThreads)
If (UnusedThread)<(MinThread)&(TotalThread)<(MaxThread)
    Increase threads in the thread pool
```

Figure 8C:
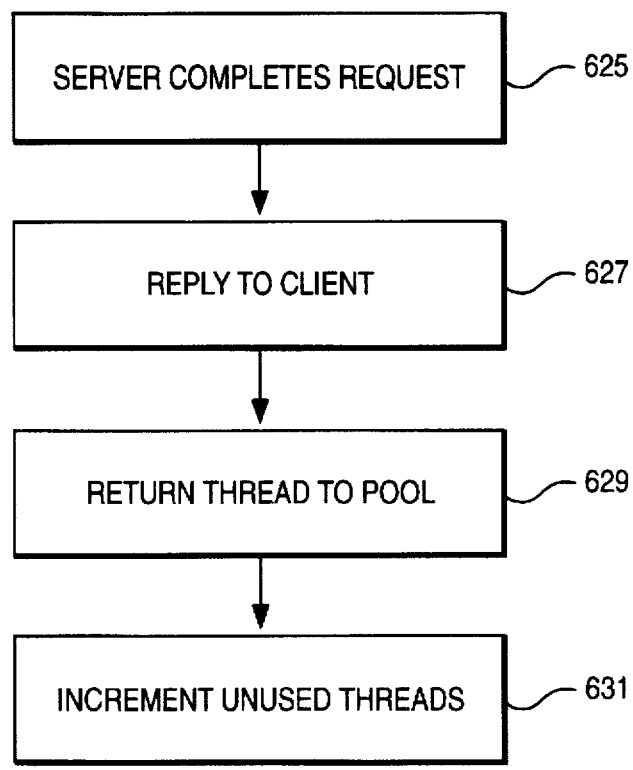
Figure 8C:
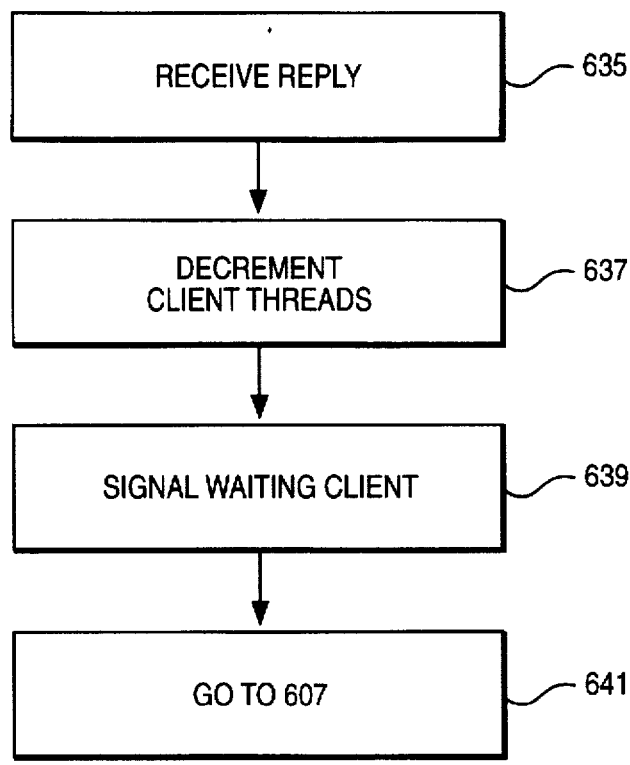

The process followed by the client and server when the server completes a client network request is depicted in FIG. 8C. On the server side, the server has completed whatever processing is required for the client request in step 625. In step 627, the reply to the client request is sent via the protocol stack. The server thread is then returned to the thread pool in step 629. Next, in step 631, the (UnusedThreads) variable is incremented.

On the client side, the protocol stack receives the reply from the server in step 635. In step 637, the (ClientThreads) variable is decremented to allow other client tasks to use the client's allocation of communication threads. In step 639, a signal to wake up any threads from the same client waiting to send request to the server due to (ClientThread) over the (MaxReq) limit is issued. In step 641, the process goes to step 607 in FIG. 8B.

Figure 8D:
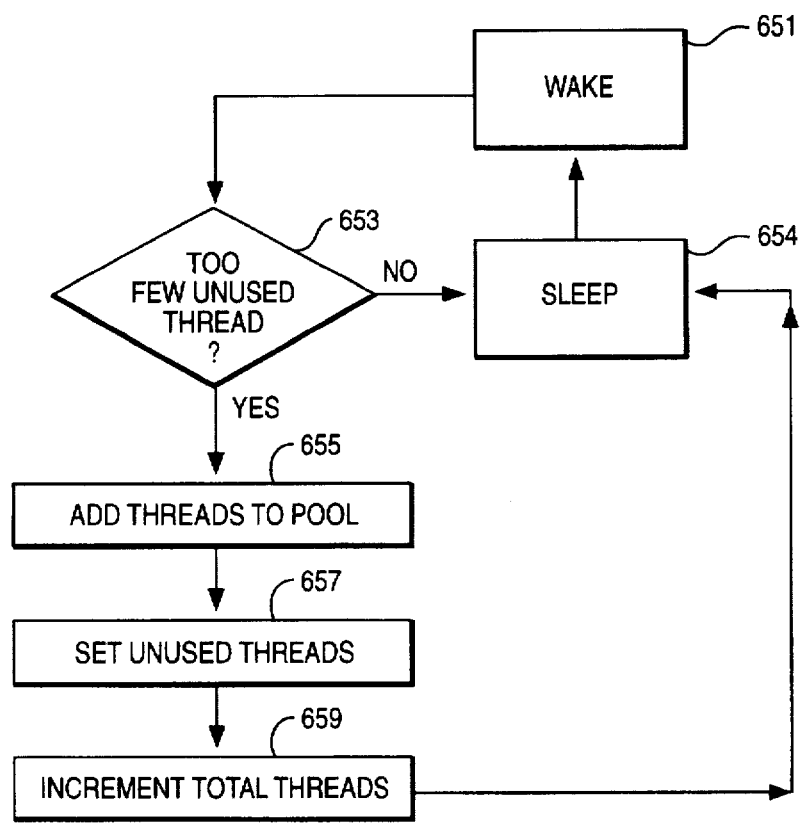
Figure 8D:
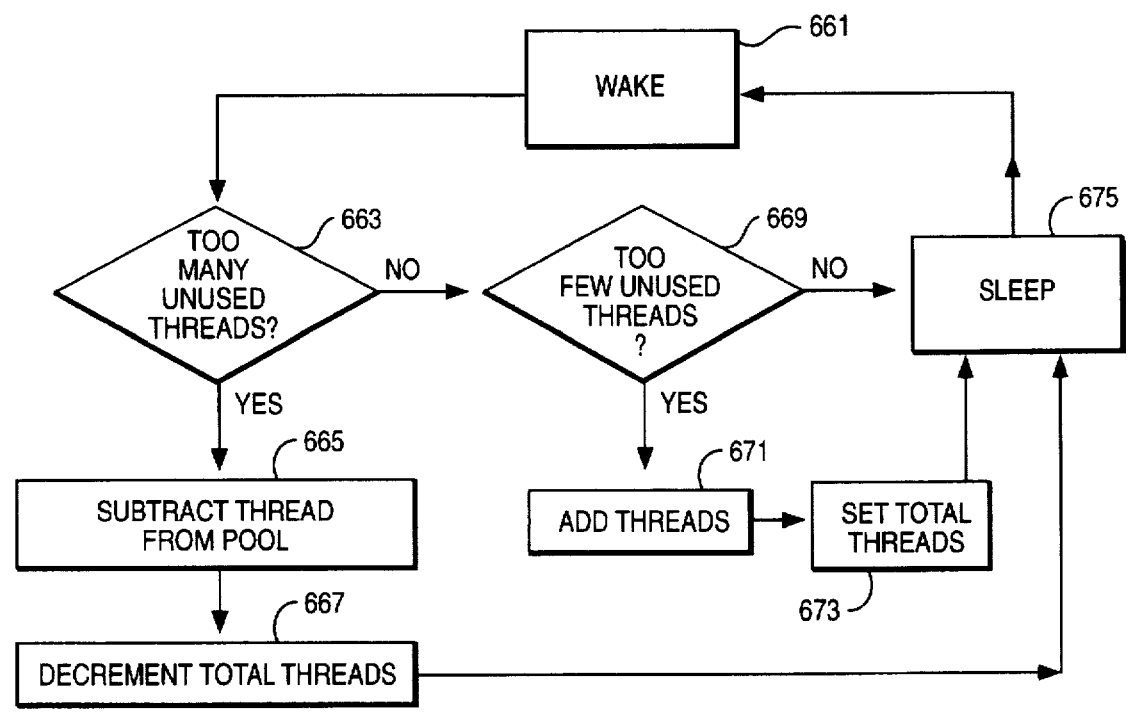

The server management thread process is illustrated in FIG. 8D. The server management thread is wakened either by a timer or by signals for thread allocation when the number of unused threads in the thread pool falls below some lower limit. A test is performed in step 653 to determine whether more threads need to be added. One suitable test is If ((UnusedThreads)<(MinThreads) & (TotalThreads)<(MaxThreads)). If not, the management thread goes back to sleep in step 654. If so, in step 655, communication threads are added to the thread pool according to the equation: Add ((UnusedThreads)−(MinThreads)) number of threads into pool. In step 657, (UnusedThreads) are set to equal (MinThreads). Note that threads will only be added when immediately when UnusedThreads falls below the (MinThreads) limit. Otherwise, threads will be delayed until the next timer interval. In step 659, the (TotalTThreads) variable is incremented by the number of threads added. The management thread goes back to sleep, step 654.

FIG. 8D also shows the server management thread method for reducing the number of unused threads in the communication thread pool to improve performance. In step 661, the thread is wakened by a timer which periodically wakens the thread for communication thread allocation or deallocation. A test is performed in step 663 to determine whether there are too many threads in the thread pool, e.g., If ((ReservedThreads)<(MinThreads)) & ((UnusedThread)>(MinThreads)). If not, the thread sleeps, step 664, until the next interval. If so, the number of threads in the pool is reduced by 1 in step 665. The (TotalThreads) is decremented by 1 in step 667. If there is no activity for a period of time, the (TotalThreads) variable will return to (MinThread) eventually. A test in step 669 determines whether there are too few unused threads in the thread pool. The equation If (ReservedThreads)>(TotalThreads) & ((ReservedThreads)<(MaxThreads)) can be used. If so, threads are added to the thread pool according to the equation Add ((ReservedThreads)−(TotalThreads)). In step 673, the (TotalThreads) variable is set to (ReservedThreads). The management thread goes back to sleep, step 675.

The advantages of this invention include admission control for session and normal client requests. Further, there are always guaranteed thread resources to service client requests, up to the limit allowed for the client task. No client will be starved indefinitely waiting for server thread resources.

With pre-allocated threads which can be shared among all clients, the performance of the server improves response time to client requests as thread creation or deletion are not performed at the thread execution path serving the client request. The overcommitted thread resources are minimized by periodically pruning back the number of allocated threads to (MinThreads) in times of inactivity. The total number of server threads in the pool can grow up to the configured (MaxThreads) value. This reduces system overhead as inactive threads will be kept to a minimum.

Dynamic thread resource adjustment is accomplished by the invention since (MaxThreads) and (MinThreads) are configured limits and can be made accessible to the system administrator. They can be adjusted either by manually configured and tuned to the minimum values optimal for the installation. Alternatively, statistics can be kept on the number of clients and concurrent client requests at various times of the day, and the values of the (MinThreads) and (MaxThreads) can be computed and adjusted automatically based on these statistics.

While a thread pool concept may have been used in generally in a multi-threaded client/server system, dynamic adjustment of the communication thread pool based on number of clients and client usage has not been done before. This invention has equal application for serving long or short running client requests. Further, the use of a thread pool to implement a Network Protocol Server running at user level has not been implemented in the prior art.

This invention can be implemented in any client/server system in which the server is multi-tasked and has to support a large number of clients efficiently. The solution is especially useful for systems which do not have a light-weight unit of execution, e.g., IBM mainframe MVS and many UNIX based systems.

As mentioned above, a Network Protocol Server using the above algorithm can be implemented using object oriented technology by defining a set of Network Server classes. The following is an example definition of these classes:

```
class TNetworkServer: public TNetworkThreadHandle
{
    public:
                    TNetworkServer-Class constructor
                    ~TNetworkServer-Class Destructor
                    AddClientPort-Add the Port to the Client Port
Pool
                    RemoveClientPort-Remove the Port from client
Port Pool
                    AddServerThread-Add a Thread to the ThreadPool
                    DeleteServerThread-Delete a Thread from the
ThreadPool
                    ExecuteMgmtThread-Management Thread Entry
                    ExecuteThread-NetworkThread Entry point
    private:
                    RegisterNames-Publish Server names to be
available to client
                    Network Threads class using for Network
Server Execution
class TNetworkThreadHandle:
{
    public:
            TNetworkThreadHandle-Class Constructor
            TNetworkThreadHandle-Class Destructor
            Fork-Start a new thread executing a class function
            Join-Wait for a thread to complete
            Release-Indicate thread can delete its object
    RPC class for Network client/server communication
class TNWRPCMessage {
public:
            virtual TNWRPCMessage();
            virtual ~TNWRPCMessage();
            /* client side methods: SendRequest() */
            virtual kern_return_t SendRequest (const port_t&
clientport,
                void* buffer, int& buflen); // buffer used for
inbound/outbound
            virtual kern_return_t SendRequest (const port_t&
sessionport,
                port_t& clientport, void* buffer, int& buflen);
            /* Server side methods: ReceiveRequest() &
Reply&Receive () */
            virtual kern_return_t ReceiveRequest (const port_t&
sessionport
                void* buffer, int& buflen);
```

```
        virtual kern_return_t ReceiveRequest (const port_t&
clientport_pool,
                void* buffer, int& buflen, port_t& clientport);
        virtual kern_return_t SendReply (const port_t&
newclientport,
                void* buffer, int& buflen, port_t& sessionport);
        virtual kern_return_t SendReply (const port_t&
clientport,
                void* buffer, int& buflen);
};
```

Representation of Network Requests in a Client/Server Environment

An object-oriented representation of network protocol requests for a client/server model is presented in this section. The object-oriented representation of protocol requests is of importance whenever the protocol APIs are object oriented and the protocol implementation is also object oriented. The object based client requests to access network protocols are sent to the server that in turn deliver these requests to the appropriate network protocol layer object. This invention presents a new scheme for transporting the client network requests and delivering them to the appropriate network protocol layer that resides on the server, and retrieving the results of the request to the client application. The client requests are wrapped in a "Network Operation" object which contains all the necessary information so that the server can present the request to the network protocol layer object.

Consider the following scenario. The client API contains a set of object-oriented network protocol interface requests and the protocol is implemented as a stack of objects, each object representing a particular OSI layer. The network protocol stacks provide various network protocols which reside on a network server and there exists a communication mechanism such as RPC or IPC to communicate between the clients and the server. Whenever a client requests a network activity such as sending some data, the request needs to be conveyed to the appropriate network protocol stack on the server. The invention presents a unified scheme to transport such client requests to the server. The scheme takes advantage of polymorphism so that the process of shipping such requests and processing them at the server remains the same for all requests and protocol stacks.

The client interface to access network protocols is primarily via the TProtocolInterface class. The protocol implementation is based on the TProtocolLayer class to represent each of the OSI layers. The network subsystem consists of TFamilyLayer objects for each protocol such as TCP/IP and SNA, and TDataLinkLayer objects, both of which are resident in the system. The stack of TProtocolLayer objects to represent the session, transport, and network layers is created for every client endpoint and the client communication endpoint is described by the TAccessDefinition object. All these concepts, relevant classes and their functions are described in the Protocol Interface Model section above.

1. Network Operation Objects

All the network requests from the client to the server and vice-versa are transported using the TNetworkOperation objects. The TNetworkOperation objects provide a mechanism to convey the client network requests to a protocol layer in the server and relay the results to the clients from the server.

Figure 9A:
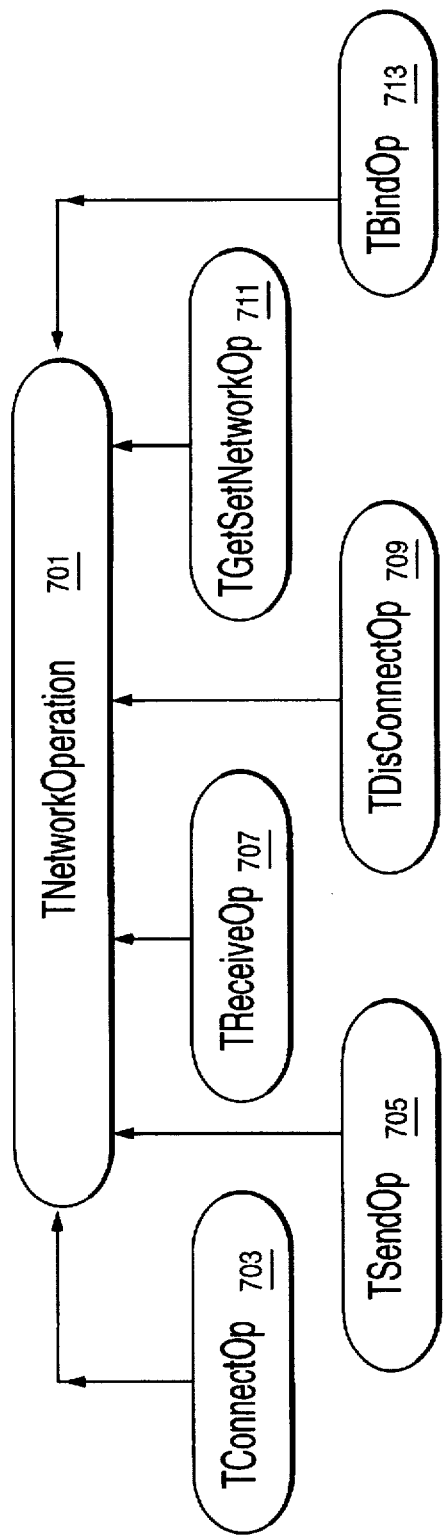
FIGS. 9A and 9B are class hierarchy diagrams for network operation objects.

The TNetworkOperation class is the base class for all requests. For each request that the client interface makes to the server, a subclass is derived from TNetworkProtocol. For every one of the TProtocolInterface methods, a corresponding "operation object" class is defined. FIG. 9A shows the class hierarchy for class objects for a few of the client requests. The TNetworkOperation class 701 sits at the top of the hierarchy. The TConnectOp class 703, TSendOp class 705, TReceiveOp class 707, TDisconnectOp class 709 and TBindOp class 713 are all derived from the base class and correspond to the connect, send, receive, disconnect and bind operations in the TProtocolInterface classes. The getter and setter requests such as GetPeerName and GetLocalName are bundled in to one operation class called the TGetSetNetworkOpclass 711.

A TNetworkOperation object is created by TProtocolInterface to satisfy a request that requires servicing in the Network Server. Classes derived from TNetworkOperation represent specific requests from the interface. The TNetworkOperation object is sent to the network server using RPC/IPC mechanism for the request to be conveyed to the appropriate protocol layer. Once the NetworkOperation object is received by the Network Server, it calls the Execute( ) method on the operation object which then calls the corresponding function on the appropriate protocol implementation layer object.

The TNetworkOperation object thus has the "in-built intelligence" to do the task required of it. The Network Server, upon receiving a TNetworkoperation object calls the Execute( ) method in that object. The server function is the same irrespective of the nature of the client request. The Execute( ) method for each client request contains all the necessary information in it to convey the client request to the appropriate protocol layer object.

The TNetworkOperation object can also be created by a concrete class of TProtocolInterface. For example, if the default class of TBindOp does not satisfy the needs of TCP/IP, then TCP/IP interface overrides the TBindOp to create a TTCPBindOp class. Then the TTCPINF class representing the concrete TCP/IP client API creates the TTCPBindOp object whenever the client makes a bind request. The ability to inherit from the TNetworkOperation class to redefine semantics of a particular client request or add new requests and their operation objects makes this scheme extremely flexible and powerful.

Figure 9B:
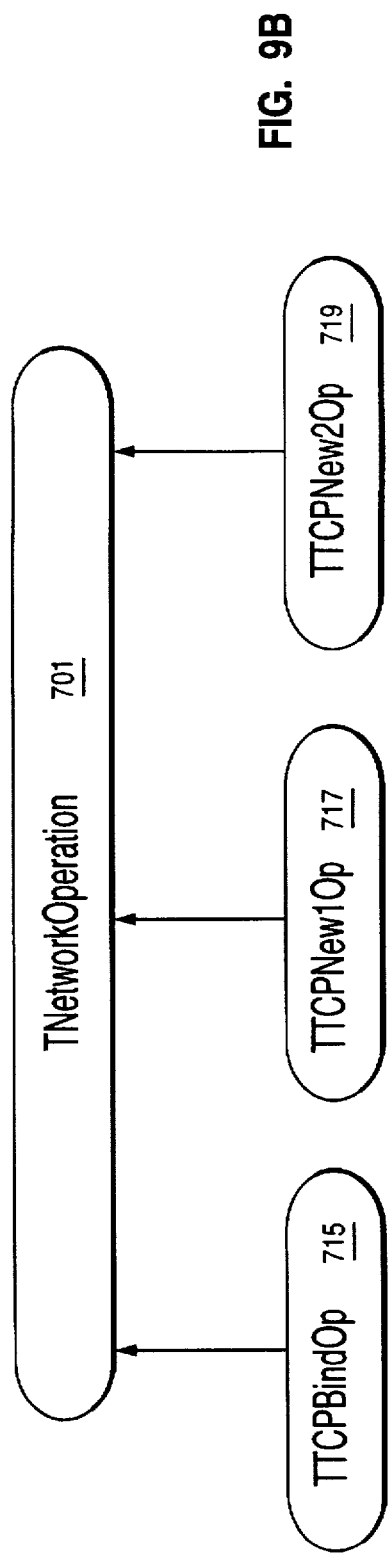

FIG. 9B illustrates the class hierarchy of class objects created according to fill specific client requests. In the figure, the TTCPBindOp object 715 is created by the TTCPTINF::Bind( ) method which serves the bind request from a client application. This overrides the TProtocolInterface::Bind( ) method. The TTCPNew1Op 717 and TTCPNew2Op 719 are the examples of two new operation objects that are specific to TCP/IP for some client requests.

2. TNetworkOperation functions

Following are some of the important functions that are provided by the TNetworkOperation class Class constructor: This function sets the protocol layer index to which the request is being made by the client application.

The layer index identifies whether the request should be sent to the Transport or Network or the Family layer of the protocol stack.

Execute( ): This function is called by the server upon receiving a TNetworkOperation object. This function gets the layer index from the operation object, collects the relevant parameters from the operation object, and then makes a call to the appropriate TProtocolLayer object of the stack. For example, a TBindOp::Execute( ) would call the TProtocolLayer::Bind( ) with the TTCPProtocolAddress object as a parameter to the Bind( ) function.

Get/SetLayerIndex: This function returns/sets the layer index in the operation object.

SetLocationToClient: By default, an operation object is sets its location to server. The operation object behaves differently if it is on the server or the client. For example, the TBindOp has to send the TNetworkAddress object to the server as it is a parameter to the TProtocolLAyer::Bind( ) function. But the server need not send the address back to the client. Using the location flag, the parameter passing is controlled. Whenever a Network operation object is created by the client, it sets the location to client.

Stream-out Operator: This function is used to flatten an operation object and put the data members of the object in to a data stream. For example, the Stream-out operator for the TBindOp flattens a TNetworkAddress object if it is sending the object from the client. A TSendOp may flatten the buffer addresses and TNetworkAddress objects to send the buffers and the destination address to the server. The server then calls the SendOp::Execute( ) which calls the TProtocolLayer::Xmit( ) method with the user data to send the data to the destination. Upon completion of send, the server sends back a TSendCompletion object to the client using RPC/IPC mechanisms. The Stream-out operator for TSendOp then checks if it is a server and then streams-out TSendCompletion object.

Stream-in Operator: This function is used to re-build an object from a data stream where the object is flattened. Obviously, it is the inverse operation of the Stream-out operator. Operation objects use the location flag to flatten/re-build objects to/from data streams.

3. Client-Server Communication

For every communication endpoint which a user creates, there must be a unique ID that must be maintained to associate an endpoint to a stack of protocol layer objects. The protocol layer objects represent the endpoint on the server process. Note that this correspondence is one-to-one. For this purpose, during the creation of the endpoint using the TACcessDefinition:: Instantiate( ) method, the TAccessOp object is created. The TAccessOp object then creates a ClientStackHead object which represents the client side of communication. The AccessOp object is then flattened and sent to the server using either the RPC or IPC mechanism by the ClientStackHead. The server then rebuilds the TAccessOp object from the data stream using stream-in operator of TNetworkOperation and calls the TAccessop::Execute( ) method. This function creates a ServerStackHead object which creates the protocol layer objects from the protocol interface objects and keeps a list of the pointers to these protocol layer objects in the TServerStackHead object. The TServerStackHead pointer is stored in a global table of the network server and the index is streamed-out to the client. The TClientStackHead object stores the ServerStackHead ID and uses it for all subsequent operations. Thus, the ServerStackHeadID serves as a unique ID between a client and the server. Subsequent requests such as a TBindOp when received by a server, it locates the corresponding server stack head using the ID that is passed in the TBindOp.

The TClientStackHead and the TServerStackHead manage communication between the client and the server for a given endpoint. These objects provide the link between the TAccessDefinition object which is the client endpoint handle and the corresponding stack of TProtocolLayer objects that represent the endpoint on the server. The ClientStackHead and the ServerStackHead pair constitute the internally managed objects that link the client and the server.

The following are some of the important function of TClientStackHead:

1. ProcessOperation: This function is called by the TProtocolInterface or TAccessDefinition objects for the TClientStackHead to process the TNetworkOperation object. This function flattens the TNetworkOperation object and send the flattened operation object to the server using RPC/IPC mechanisms provided by the system. This function also rebuilds the NetworkOperation object when the server responds to the request that was sent. Basically, this function sends and receives NetworkOperation objects to and from the server.

2. SaveServerInfo: This method is called to save the ServerStackHead ID in the ClientsStackHead. When an AccessDefinition is instantiated, the server returns the TAccessOp object with the ID for the ServerStackHead that was created for the endpoint. The NetworkOperation uses this ID whenever requests are sent to the server subsequently.

3. CancelRequests: This function is called whenever the TProtocolInterface:: CancelRequests is called by the client application or when client application terminates abnormally. The ClientStackHead creates a CancelRequestsOp operation object which informs the ServerStackHead to do the necessary clean-up.

The following are some of the important functions of ServerStackHead:

1. Class Constructor: The constructor receives a stack of TProtocolInterface objects and builds the corresponding TProtocolLayer objects. It maintains pointers to these layer objects to call these layer objects for subsequent requests.

2. ProcessOperation: This function is called by the Network-ServerProcess upon receiving a NetworkOperation object from the client. This function calls the Execute( ) method on the TNetworkOperation object after locating appropriate ProtocolLayer object. The Execute( ) method then calls the required method on the ProtocolLayer object.

3. GetProtcolLayer: This function returns a pointer to the TProtocolLayer object given an index. The index is passed by the client application.

Figure 9C:
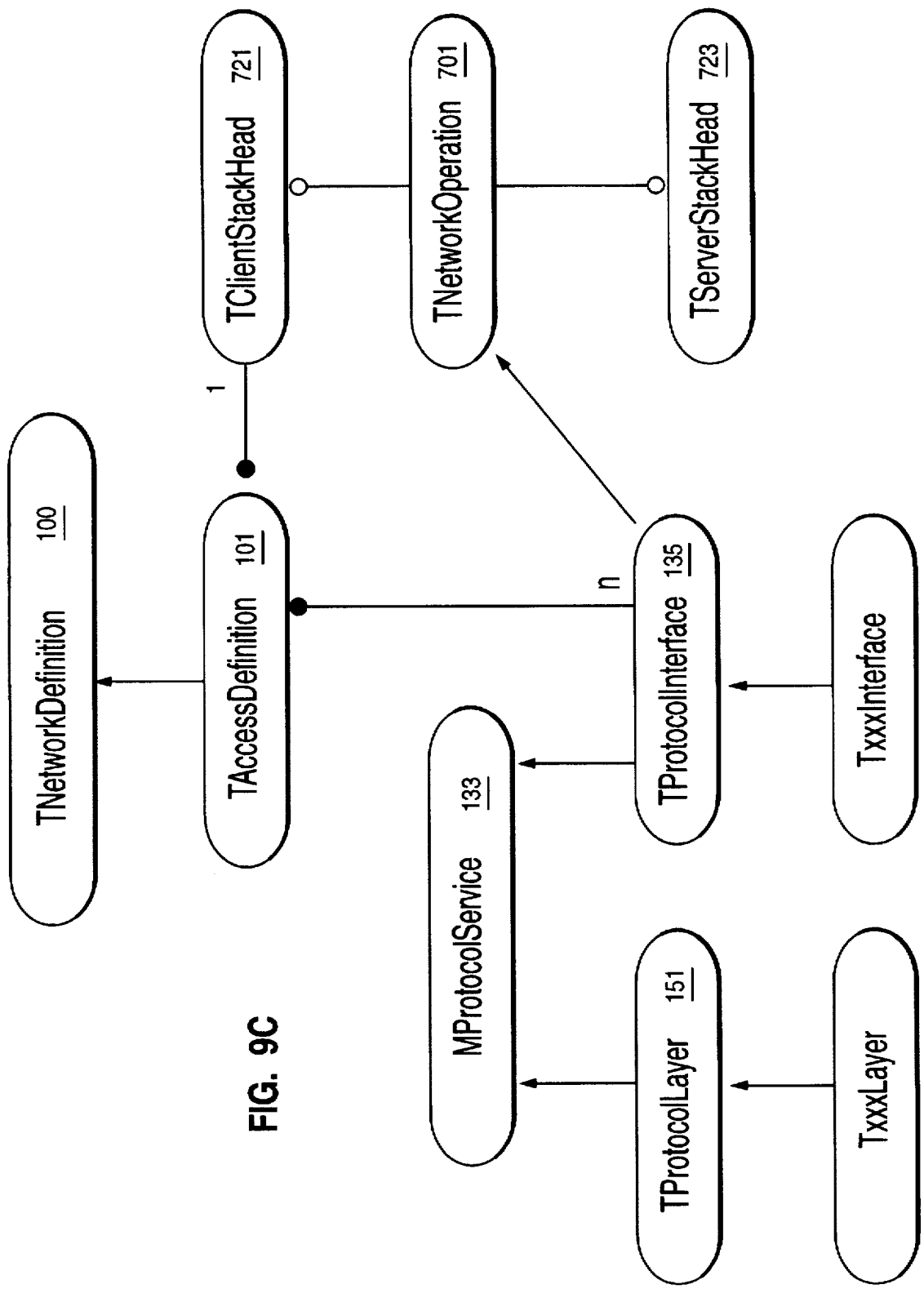
FIG. 9C shows the class relationships between various classes for the present invention.

4. CancelRequests: This function is called upon receiving the TCancelRequestsOp to cancel all the pending requests on the protocol stack. This is the server counterpart of the CancelRequests of TClientStackHead, FIG. 9C illustrates the class hierarchy for these objects. Describes the object model using the Booch notations. The TAccessDefinition 101 is derived from TNetworkDefiniton 100. The TAccessDefinition 101 contains various TProtocolInterface 135 objects that constitute the endpoint. The TAccessDefinition 101 also contains a TClientStackHead 721 which performs all the client-server communication primitive functions. The TServerStackHead 723 is the server counterpart of the ClientStackhead. The TClientStackHead and the TServerStackHead pair represents the link between the protocol interface and protocol implementation layer objects, thus linking the client application and the protocol stack on the server. Both TProtocolInterface 135 and the TProtocolLayer 151 classes are derived from the common base class MProtocolService 133. Any network request from the client is sent to the server wrapped in the TNetworkOperation 701 object. In other words, a method in the TProtocolInterface creates an appropriate TNetworkOperation object and the operation object is flattened and sent to the server by the TClientStackHead. The TNetworkOperation object uses both the TClientStackHead and the TServerStackHead.

Figure 9D:
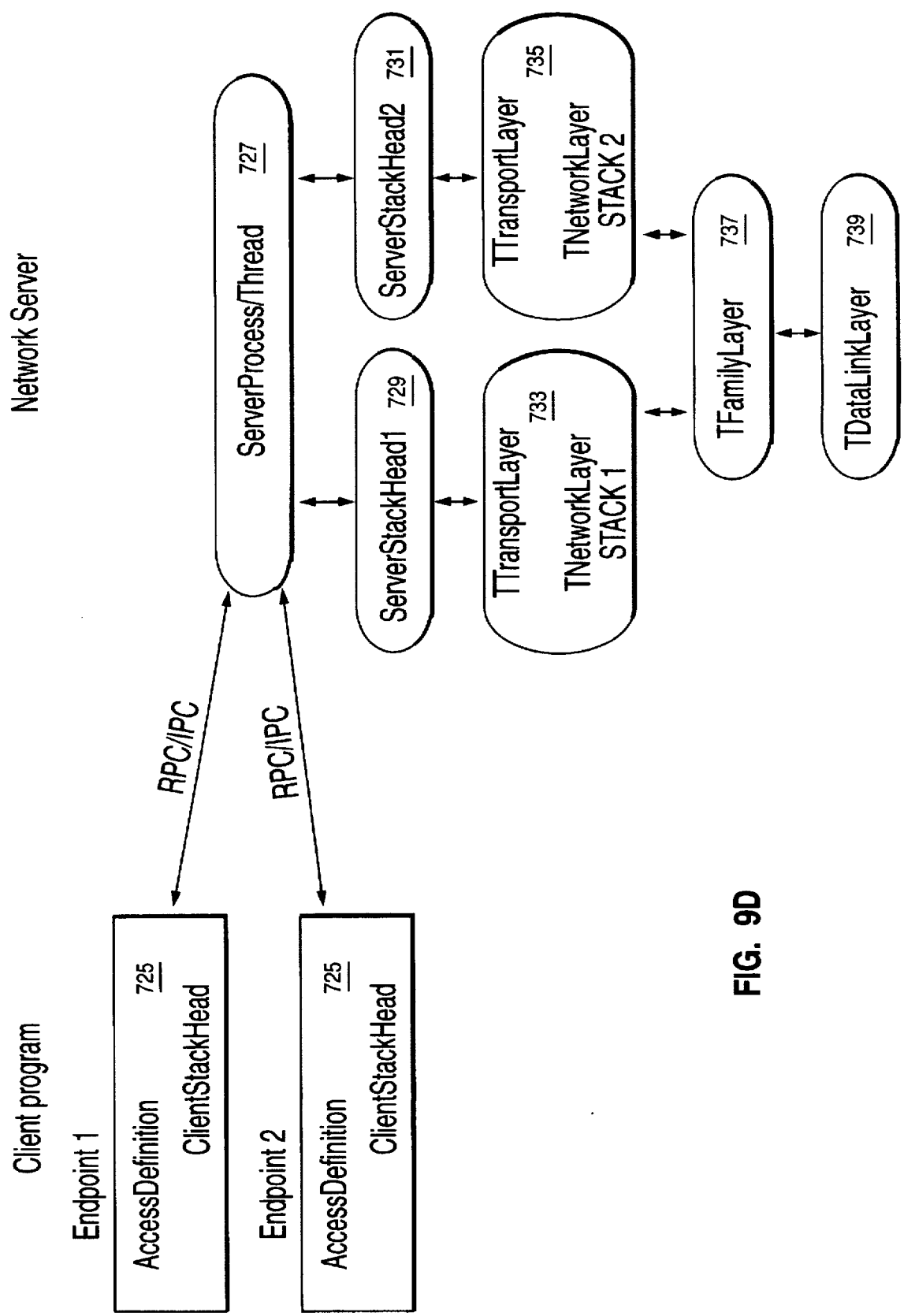
FIG. 9D depicts the flow of messages between various objects in the network according to the invention.

FIG. 9D illustrates the flow of requests from client to server and vice-versa. As explained above, an endpoint is represented by the TAccessDefinition object on the client and a stack of TProtocolLayer objects on the server. The communication between the client and the server is managed by the TclientStackHead and the TServerStackHead objects. The figure shows two endpoints 725. A network request from the client is sent to the ServerProcess/Thread 727 as a TNetworkOperation object using the system RPC or IPC mechanisms. The ServerProcess rebuilds the TNetworkoperation object, then locates the TServerStackHead object that represents the endpoint1, and routes the request to ServerStackHead 1 729. Similar processing is done to route the request from endpoint 2 to ServerStackHead2 that represents this endpoint on the server. The ServerStack1 then calls TNetworkOperation::Execute( ) method which then calls an appropriate method in TTransportLayer of stack1 733. The TTransportLayer may choose to call a method in the TNetworklayer which then sends the request to the TFamilyLayer 737. The family layer then sends the request to the TDataLinkLayer of stack1 733. The TTransportLayer may chose to call a method in the TNetworkLayer which then ends the request to the TFamilyLayer 737. The family layer then sends the request to the TDataLinkLayer 739 after processing the request which may send a request to the adapter. Whenever the DataLinkLayer receives some packet over the adapter, it dispatches the packet to the family layer. The TFamilyLayer routes the packet to appropriate stack. Upon returning from the call to TTransportLayer, the TNetworkOperation ::Execute( ) collects the response and sends the TNetworkOperation object back to the appropriate TClientStackHead using the system RPC/IPC mechanisms. The procedure is the same for any request on endpoint 2 and stack2 735 that represents the endpoint on the server.

FIG. 9D illustrates the relationships between class objects in the client and server. The example assumes the general network client/server model.

3. An example

Figure 10:
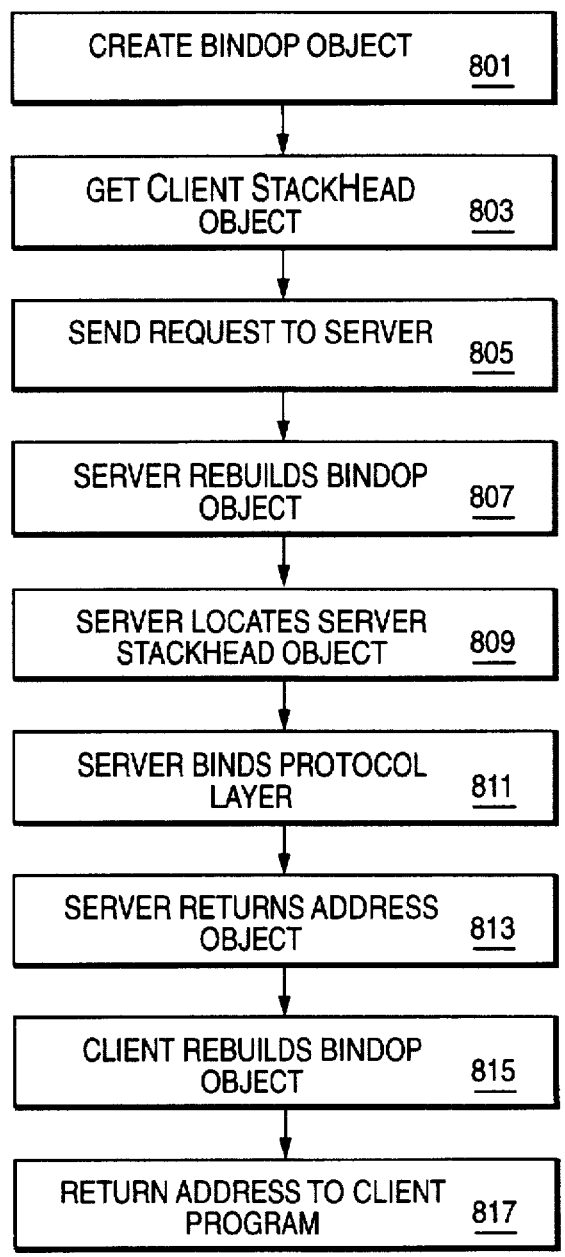
FIG. 10 is a flow diagram for passing network protocol requests in a network operation object.

Consider TTCPTINF which represents the TCP/IP transport interface. Assume that TTCPTINF::Bind( ) takes a TTCPAddress as input parameter and returns a TTCPAddress object. Note that the TTCPAddress is derived from the TProtocolAddress. As shown in FIG. 10, the TTCPTINF::Bind( ) method does the following:

In step 801, the TNetworkOperation object TTCPBindOp is created.

In step 803, gets the ClientStackHead object for this AccessDefinition.

In step 805, ClientStackHead::ProcessOperation( ) is calledto flatten the TTCPAddress in the TTCPBindOp object and send the request to the server. The server re-builds the flattened TTCPBindOp from the message stream, e.g., RPC/IPC in step 807.

In step 809, the server locates the ServerStackHead object from the stackID passed in the TTCPBindOp object.

In step 811, the ServerStackHead object then calls TProtocolLAyer::Bind( ) to the appropriate protocol layer object.

The call to bind returns a TTCPAddress object and the server restores the return information (the address ) in the TTCPBindOp and streams it back to the client, step 813 the ClientStackHead re-builds the TTCPBindOp( ) object from the message stream. Finally, in step 817, the TTCPINF::Bind( ) then retrieves the TTCPAddress from the TTCPBindOp and returns it to the client program.

While the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would recognize that the invention could be carried out in hardware, in firmware or in any combination of software, firmware or hardware including a special purpose apparatus specifically designed to perform the described invention. Therefore, changes in form and detail may be made therein without departing from the spirit and scope of the invention as set forth in the accompanying claims.

We claim:

1. A method for establishing communication paths between communication endpoints in a computer network, comprising the steps of:

responsive to a communication request from an application, creating a new instance of network address object from a network address class object to define a local communication endpoint for the application;:

creating a new set of protocol layer objects, each from a respective protocol layer class object, and binding the new protocol layer objects to form an object based protocol stack for the local communication endpoint;

creating a new set of protocol interface objects, each from a respective protocol interface class object;

associating each newly created protocol interface object with a corresponding newly created protocol layer object to provide external interfaces for the requesting application to each of the newly created protocol layer objects; and calling a selected newly created protocol interface object from the local communication endpoint to establish the communication path to the network to a remote communication endpoint through the selected newly created protocol interface object and newly created protocol layer objects in the protocol stack.

2. The method as recited in claim 1 wherein the requesting application is a communications API layer and the method further comprises the step of creating a new network definition object from a network definition class object to define an interface between the network address object and the communications API layer.

3. The method as recited in claim 1 wherein the requesting application is an operating system service and the selected protocol interface object provides an interface for a protocol layer situated at a mid level in the protocol stack.

4. The method as recited in claim 1 further comprising the step of deleting protocol layer objects, the protocol interface objects and the network address object at the conclusion of communication between the local and remote communication endpoints.

5. The method as recited in claim 1 wherein the protocol stack is formed for a first requesting application and wherein the steps are repeated for a second requesting application to form a second protocol stack.

6. The method as recited in claim 1 wherein the protocol stack is formed for a first requesting application using a first network protocol and wherein the steps are repeated for a second requesting application to form a second protocol stack using a second network protocol from a different set of protocol layer class objects and a different set of protocol interface class objects.

7. The method as recited in claim 1 wherein the protocol interface objects are implemented as state machines operable to a plurality of permitted states for a network protocol.

8. A system including processor, memory and network connection means for establishing communication paths between communication endpoints in a computer network, comprising:

means responsive to a communication request from an application for creating a new instance of network address object from a network address class object to define a local communication endpoint for the application;

means for creating a new set of protocol layer objects, each from a respective protocol layer class object, and binding the new protocol layer objects to form an object based protocol stack for the local communication endpoint;

means for creating a new set of protocol interface objects, each from a respective protocol interface class object;

means for associating each newly created protocol interface object with a corresponding newly created protocol layer object to provide external interfaces for the requesting application to each of the newly created protocol layer objects; and means for calling a selected newly created protocol interface object from the local communication endpoint to establish the communication path to the network to a remote communication endpoint through the selected newly created protocol interface object and newly created protocol layer objects in the protocol stack.

9. The system as recited in claim 8 wherein the requesting application is a communications API layer and the system further comprises means for creating a new network definition object from a network definition class object to define an interface between the network address object and the communications API layer.

10. The system as recited in claim 8 wherein the requesting application is an operating system service and the selected protocol interface object provides an interface for a protocol layer situated at a mid level in the protocol stack.

11. The system as recited in claim 8 further comprising means for deleting protocol layer objects, the protocol interface objects and the network address object at the conclusion of communication between the local and remote communication endpoints.

12. The system as recited in claim 8 wherein the protocol stack is formed for a first requesting application using a first network protocol and wherein the steps are repeated for a second requesting application to form a second protocol stack using a second network protocol from a different set of protocol layer class objects and a different set of protocol interface class objects.

13. The system as recited in claim 8 wherein a plurality of protocol stacks are created for a corresponding plurality of requesting applications using a network protocol and the plurality of protocol stacks are bound to a persistent family protocol layer object for the network protocol.

14. The system as recited in claim 13 wherein a plurality of network protocols are used and a persistent family protocol layer object for each protocol is bound to a persistent data link layer object for all network protocols.

15. A computer program product in a computer readable medium for establishing communication paths between communication endpoints in a computer network, comprising:

means responsive to a communication request from an application for creating a new instance of network address object from a network address class object to define a local communication endpoint for the application;

means for creating a new set of protocol layer objects, each from a respective protocol layer class object, and binding the new protocol layer objects to form an object based protocol stack for the local communication endpoint;

means for creating a new set of protocol interface objects, each from a respective protocol interface class object;

means for associating each newly created protocol interface object with a corresponding newly created protocol layer object to provide external interfaces for the requesting application to each of the newly created protocol layer objects; and means for calling a selected newly created protocol interface object from the local communication endpoint to establish the communication path to the network to a remote communication endpoint through the selected newly created protocol interface object and newly created protocol layer objects in the protocol stack.

16. The product as recited in claim 15 wherein the requesting application is a communications API layer and the system further comprises means for creating a new network definition object from a network definition class object to define an interface between the network address object and the communications API layer.

17. The product as recited in claim 15 wherein the requesting application is an operating system service and the selected protocol interface object provides an interface for a protocol layer situated at a mid level in the protocol stack.

18. The product as recited in claim 15 further comprising means for deleting protocol layer objects, the protocol interface objects and the network address object at the conclusion of communication between the local and remote communication endpoints.

19. The product as recited in claim 15 wherein the protocol stack is formed for a first requesting application using a first network protocol and wherein the steps are repeated for a second requesting application to form a second protocol stack using a second network protocol from a different set of protocol layer class objects and a different set of protocol interface class objects.

20. The product as recited in claim 15 further comprising a protocol information class for identifying characteristics of a network protocol.

* * * * *

UNITED STATES PATENT AND TRADEMARK OFFICE
CERTIFICATE OF CORRECTION

PATENT NO : 5,764,915
DATED : June 9, 1998
INVENTOR(S) : Heimsoth et al

It is certified that error appears in the above-identified patent and that said Letters Patent are hereby corrected as shown below:

Column 13, line 8, after "objects" please insert --(collectively referred to as TTCPXINF)--;

18, line 25, after "categorization" please insert --,--.

Signed and Sealed this

Fifteenth Day of May, 2001

Attest:

NICHOLAS P. GODICI

Attesting Officer

Acting Director of the United States Patent and Trademark Office